(12) United States Patent
Schroader et al.

(10) Patent No.: US 11,459,188 B2
(45) Date of Patent: Oct. 4, 2022

(54) RANGE SENSING CONVEYOR PACKAGE MANAGEMENT SYSTEM FOR MEASURING AND CONTROLLING DENSITY OF PARCELS ON A CONVEYOR

(71) Applicant: FIVES INTRALOGISTICS CORP., Louisville, KY (US)

(72) Inventors: Steven Vann Schroader, Louisville, KY (US); Gus Nowotny, Goshen, KY (US)

(73) Assignee: Fives Intralogistics Corp., Louisville, KY (US)

( * ) Notice: Subject to any disclaimer, the term of this patent is extended or adjusted under 35 U.S.C. 154(b) by 0 days.

(21) Appl. No.: 17/165,340

(22) Filed: Feb. 2, 2021

(65) Prior Publication Data

US 2021/0292100 A1    Sep. 23, 2021

Related U.S. Application Data

(63) Continuation-in-part of application No. PCT/US2020/042429, filed on Jul. 16, 2020, which is
(Continued)

(51) Int. Cl.
*B65G 47/31* (2006.01)
*G05B 19/05* (2006.01)
(Continued)

(52) U.S. Cl.
CPC .......... *B65G 47/31* (2013.01); *B65G 43/10* (2013.01); *G05B 19/05* (2013.01); *G06T 7/0004* (2013.01); *G06T 7/50* (2017.01); *G06T 7/62* (2017.01); *G06T 7/70* (2017.01); *H04N 5/247* (2013.01); *B65G 2203/0233* (2013.01); *B65G 2203/0258* (2013.01); *B65G 2203/044* (2013.01); *B65G 2811/095* (2013.01); *G05B 2219/14076* (2013.01); *G06T 2207/30108* (2013.01); *G06T 2207/30242* (2013.01)

(58) Field of Classification Search
CPC ............... G06K 9/00577; B65G 43/08; B65G 47/1492; B65G 47/31; B65G 47/54; B65G 13/104; B65G 67/24; B65G 2203/0208; B65G 2203/0241; B65G 2203/041; B65G 2203/044; B65G 2203/042
See application file for complete search history.

(56) References Cited

U.S. PATENT DOCUMENTS 5,141,097 A    8/1992   Oiry et al.
5,165,520 A    11/1992  Herve et al.
(Continued)

FOREIGN PATENT DOCUMENTS

CN    110997529 B  *  1/2022   ............... B07C 3/02

*Primary Examiner* — Michael McCullough
*Assistant Examiner* — Lester Rushin, III
(74) *Attorney, Agent, or Firm* — Carrithers Law Office, PLLC

(57) ABSTRACT

The present invention relates to the field of using different sensing and detection methods to determine parcel flow density 1D lineal, 2D area or 3D volumetrically on a selected section of a feed conveyor and receiving conveyor and adjusting conveyor speed ratios proportioned according to ratio of desired density to current density to increase the density or volume of parcels in a selected area of the receiving conveyor.

54 Claims, 9 Drawing Sheets

Related U.S. Application Data a continuation-in-part of application No. 16/188,992, filed on Nov. 13, 2018, now Pat. No. 10,906,746.

(51) Int. Cl.

| | | |
|---|---|---|
| *G06T 7/62* | (2017.01) | |
| *G06T 7/50* | (2017.01) | |
| *G06T 7/00* | (2017.01) | |
| *H04N 5/247* | (2006.01) | |
| *G06T 7/70* | (2017.01) | |
| *B65G 43/10* | (2006.01) | |

(56) References Cited

U.S. PATENT DOCUMENTS

| | | | |
|---|---|---|---|
| 5,871,078 A | 2/1999 | Arnarson et al. | |
| 6,401,936 B1 * | 6/2002 | Isaacs | B65G 43/08 198/367.1 |
| 6,471,044 B1 | 10/2002 | Issacs et al. | |
| 6,629,018 B2 * | 9/2003 | Mondie | B65G 47/28 198/460.1 |
| 6,729,463 B2 | 5/2004 | Pfeiffer | |
| 6,751,524 B2 | 6/2004 | Neary et al. | |
| 7,191,895 B2 | 3/2007 | Zeitler et al. | |
| 7,413,071 B2 | 8/2008 | Zeitler et al. | |
| 7,591,365 B2 | 9/2009 | Kneppel et al. | |
| 7,631,747 B2 | 12/2009 | Zeitler | |
| 8,061,506 B2 | 11/2011 | Schafer | |
| 8,201,681 B2 | 6/2012 | Schiesser et al. | |
| 8,360,230 B2 | 1/2013 | Rompe | |
| 8,408,380 B2 | 4/2013 | Doane | |
| 2001/0030102 A1 | 10/2001 | Woltjer et al. | |
| 2001/0035332 A1 | 11/2001 | Zeitler | |
| 2003/0141165 A1 * | 7/2003 | Reznik | B65G 47/30 198/434 |
| 2007/0246328 A1 | 10/2007 | Reznik | |
| 2009/0114575 A1 | 5/2009 | Carpenter et al. | |
| 2009/0145967 A1 | 6/2009 | Carpenter | |
| 2009/0250311 A1 | 10/2009 | Honegger | |
| 2010/0012464 A1 | 1/2010 | Schiesser et al. | |
| 2010/0155194 A1 | 6/2010 | Schafer | |
| 2011/0056798 A1 | 3/2011 | Vok et al. | |
| 2011/0214964 A1 | 9/2011 | Zimmermann | |
| 2011/0240439 A1 | 10/2011 | Rompe | |
| 2013/0056329 A1 | 3/2013 | Grootherder | |
| 2014/0121826 A1 | 5/2014 | Kreitmeier et al. | |
| 2014/0364998 A1 | 12/2014 | Neiser et al. | |
| 2021/0047132 A1 * | 2/2021 | Sines | B65G 47/31 |
| 2021/0096540 A1 * | 4/2021 | Odegard | G05B 19/4183 |
| 2022/0081221 A1 * | 3/2022 | Beuchert | B65G 15/24 |
| 2022/0089378 A1 * | 3/2022 | Schoenbauer | B65G 47/31 |
| 2022/0112034 A1 * | 4/2022 | Dwivedi | B65G 43/08 |

* cited by examiner

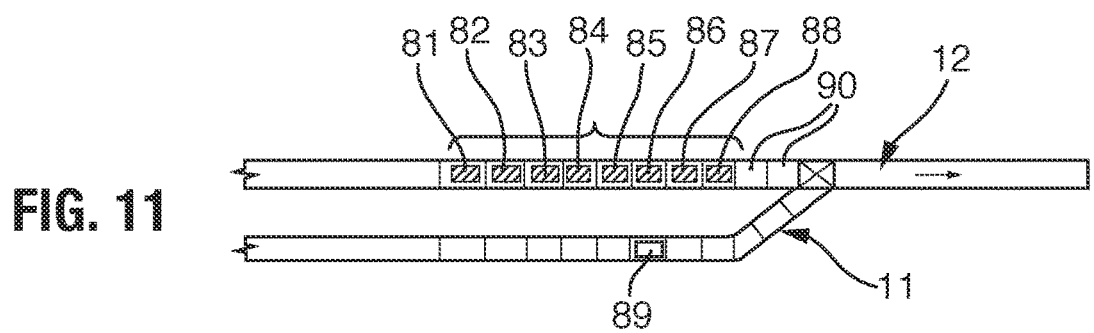
FIG. 11
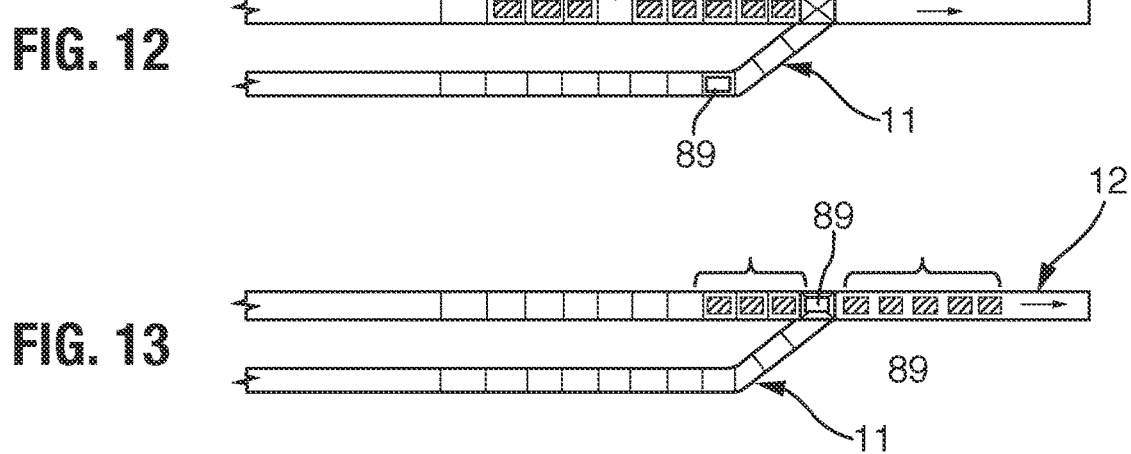
FIG. 12
FIG. 13
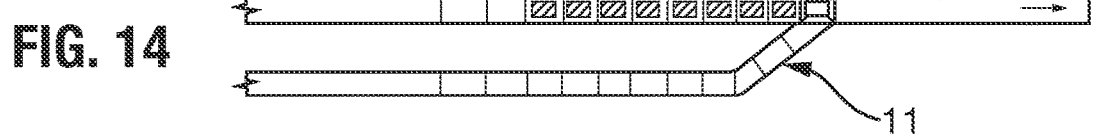
FIG. 14
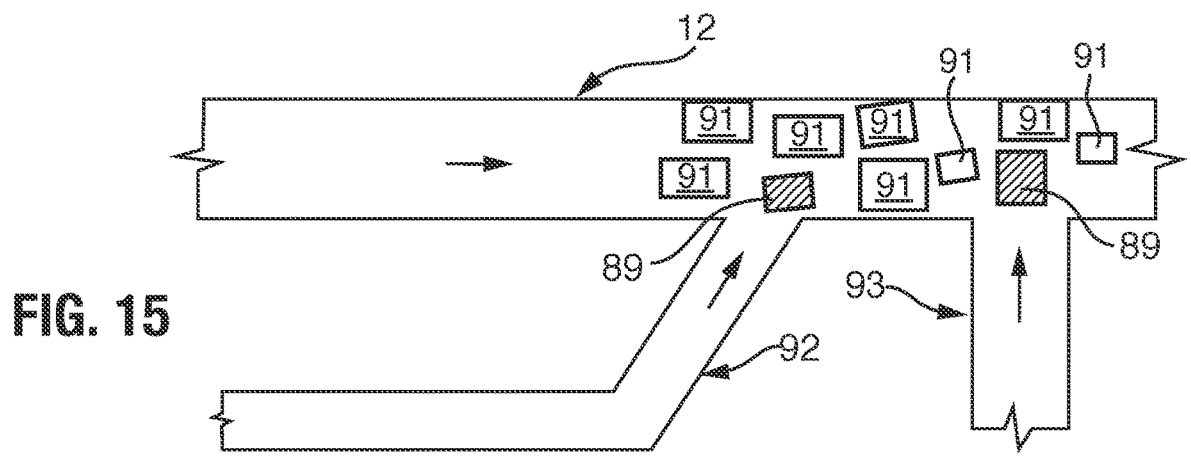
FIG. 15

RANGE SENSING CONVEYOR PACKAGE MANAGEMENT SYSTEM FOR MEASURING AND CONTROLLING DENSITY OF PARCELS ON A CONVEYOR

CROSS REFERENCE TO RELATED APPLICATIONS

This application is Continuation in Part of PCT/US2020/042429 filed on Jul. 16, 2020 and U.S. application Ser. No. 16/188,992 filed on Nov. 13, 2018 both of which are incorporated by reference herein in their entirety.

TECHNICAL FIELD

The present invention relates to the field of using different sensing and detection methods to detect and control parcel flow density on conveyors.

BACKGROUND OF THE INVENTION

Conveying systems often serve the function of aligning and spacing articles on the conveying system to be processed by a downstream sorting system. Conventional conveyance systems typically involves controlling the articles in such a way that the articles leaving the induction subsystem have gaps between them or beside them that are close to a desired length. The desired gap may be variable depending upon the length and/or width of one or more of the pair of articles that define the gap, or the desired gap may be constant. Regardless of the criteria used to determine the length of the desired gap, the gap serves the purpose of facilitating the sorting of the articles. Sorting systems often function more effectively if the articles being sorted have a certain minimum gap between them. However, gaps exceeding this minimum will generally decrease the throughput of the conveying system. It is desirable to create gaps that balance sorting criteria while maximizing the throughput to the sorting and singulator apparatus; however, at the point of induction where the parcels are fed onto a plurality of conveyors from various feed points such as truck unloading stations, maximum efficiency is achieved by moving as many parcels as possible on a given area of the conveyor.

Due to the variability of the amount of product coming in on various feed belts, imbalances occur at different merge areas in the conveying system causing large open spots on the collector belt, singulator belt and sorting area. This fact causes inefficiency, an unnecessary investment in equipment, and a degradation of overall throughput to the sorter. Conventional flow management systems count packages and/or control the speed of conveyors to orient or single packages and create a desired minimum gap there between for processing. Examples of these devices is set forth in the following patent and/or publications.

U.S. Pat. No. 5,165,520 teaches a conveying system which spaces parcels on a belt and includes a camera system which recognizes overlapping or crowding of parcels and diverts the offending parcels. U.S. Pat. No. 8,061,506 teaches merging articles onto conveyors using information gathered from optical sensors or cameras to recognize or create an gas on a collector belt and fill these gaps with a package from an feed belt; however, Schafer does not discuss the method of processing information from cameras or optical sensors to control the concentration of same. Publication (WO200066280) describes a system using a camera to determine the number of parcels and uses this information to control the speed conveyors such as a parcel feeder conveyor, acceleration conveyor, buffer conveyor, singulator and transportation conveyor; however, the reference does not teach nor suggest the idea of controlling the speed of conveyance in order to maximize the area covered on the conveyor as a function of occupancy on a collector or just prior to singulator. U.S. Pat. No. 6,471,044 teaches that images are transferred to a control system where the images are interpreted to determine the number of packages and the average size of the packages to regulate the speed of the parcel feeder conveyor, buffer conveyor, acceleration conveyor, singulator, and transport conveyor, but not the density of the packages on a given area of the conveyor. U.S. Pat. No. 5,141,097 teaches analysis of an image supplied by a camera to provide an indication of the number of packages present in this image and increase the conveyor speed to obtain the desired throughput. U.S. Pat. No. 6,401,936 teaches a detection system for monitoring the stream of articles and identifying and/or tracking individual items passing through the system used in conjunction with a singulator, hold-and-release or strip conveyor downstream from the coarse singulator wherein the control system is utilized in connection with the detection system to regulate the flow of articles through the system by increasing the speed of the conveyor.

Conventional systems utilize methods of either counting carton feet or parcels released from the container unload conveyors, and adjusting the speeds of the unload conveyors to maintain the input flow at a manageable level for the singulator and sorter. The goal is to keep the system fed, without over-feeding. Current parcel conveyor systems have sorter capacity of 12,150 parcels per hour (pph) with a 12 inch gap at 540 feet per minute (fpm), and with a 20 inch average. The result is that the system throughput efficiency is limited, and typical sustained performance capability is only expected to be about 60% of sorter capacity. There is a need for a control system to maximize the occupancy and density of packages on a given area of a receiving conveyor for unloading packages and a mechanism for sensing physical characteristics of packages from a transport such as rail car, airplane, ship, or truck in order to send the article to the appropriate sorting system and controlling the transfer speed of the articles.

SUMMARY OF THE INVENTION

The present invention relates to the field of using different sensing and detection methods to determine parcel flow density 1D lineal, 2D area or 3D volumetrically on a selected section of a feed conveyor and receiving conveyor and adjusting conveyor speed ratios proportioned according to ratio of desired density to current density to increase the density or volume of parcels in a selected area of the receiving conveyor.

Density measuring apparatus recognizes and maximizes conveyor surface area utilization. Sensing and detection apparatus determine parcel flow density 1D lineal, 2D area or 3D volumetrically on a selected area of a conveyor and adjust feed and receiver conveyor speed ratios proportioned according to ratio of desired density to current density to increase the density or volume of parcels in a selected area enhancing the performance and throughput of conveyor systems. Sensing and/or detection apparatus are positioned at flow entry points or transition points between the feeder and receiver conveyor. A control algorithm recognizes individual items area, volume or density and the rate of speed or velocity at which individual objects are passing on a selected area of the feed conveyor and receiving conveyor surface and the area utilization of the feed conveyor and receiving conveyor to maintain a desired density of packages on the receiving conveyor surface.

The bulk parcel flow management system comprises or consists of a density based detection system that recognizes belt area utilization, and parcel count. The system density detection devices positioned at flow entry points and at the singulator. The control algorithm requires recognition of individual items and the rate at which individual objects are passing, and the area utilization of the collector belt. Average parcel size (area or volume) including length, width, and height can be considered as well. Moreover, the density defined as (area, volume or weight) of a parcel can be considered in conveyor surface area utilization. The present invention provides a means for increasing conveyor area and/or volume and/or density by controlling feed and receiving conveyor movement defined as speed "velocity" to fill available space on the receiving collector conveyor. The conveyor package management system may also identify, locate, or trace a package, parcel, or other item on the conveyor by its digital image, scanner code, or footprint.

The present invention comprises or consists of an apparatus for detecting and measuring the density of parcels on a selected section of a conveying surface, comprises or consists of a plurality of photo eyes for creating a table of sensing range, wherein each photo eye has two outputs and each one is independently adjustable to obtain two different ranges. The plurality of photo eyes are installed on a first side and an opposing second side of a selected section of a feed conveyor having a conveying surface extending to a receiving conveyor having a conveying surface at a selected distance from an discharge end of the feed conveyor and a receiving end of the receiving conveyor. A virtual encoder is programmable to produce a pulse at selected intervals of the feed conveyor. An array includes a plurality of array elements, each of the array elements representing one pulse of the virtual encoder defining a selected length of the selected distance. A programmable logic controller having an algorithm for calculating the average measured occupancy of the array representing a percentage of fullness of the receiving conveyor.

The method of detecting and measuring the density of parcels on a selected section of a conveying surface, comprises or consists of the steps of creating a table of sensing range with a plurality of photo eyes, wherein each photo eye has two outputs and each one is independently adjustable to obtain two different ranges. The plurality of photo eyes is installed on a first side and an opposing second side of a selected section of a feed conveyor and a receiving conveyor at a selected distance from an discharge end of the feed conveyor and a receiving end of the receiving conveyor. A pulse is produced at selected intervals along the selected section of the conveying surface with a programmable virtual encoder. An array is formed including a plurality of array elements, each of the array elements representing one pulse of the virtual encoder defining a selected length of the selected distance. The average measured occupancy of the array is calculated by determining the combination of photo eye outputs blocked when an encoder pulse occurs representing a percentage of fullness of the receiving conveyor with a programmable logic controller using an algorithm. The measured occupancy to a desired occupancy of the feed conveyor is compared to the receiving conveyor. A speed ratio is calculated by dividing the desired occupancy by the measured occupancy. The speed of the feed conveyor, the receiving conveyor, or the feed conveyor and the receiving conveyor is regulated to obtain a desired occupancy on the receiving conveyor.

In addition to range sensing photo eyes, sensors may include a opposing or left and right range sensor photo eyes, vibration sensors, heat detection sensors, weight sensors, cameras, and smart light stacks in electrical communication with the PLC or computer.

It is an object of this invention to provide a range sensing conveyor package management system which includes photo eyes which monitor the packages at the merge areas of the feed conveyors, all along the collector conveyor, the singulator conveyor and the sorter, identifying areas of low density and controlling the activation and speed of selected conveyors to increase the density of items of a given area of a conveyor.

It is an object of this invention to provide a range sensing conveyor package management system to utilize an algorithm and software in a computer for computing the open or unused area on the conveyors by comparing the area covered by packages on conveyors to the open area based on digital data analysis of the information coming from each of the photo eyes monitoring the conveyors.

It is an object of this invention to provide a range sensing conveyor package management system wherein the photo eyes are interfaced with a computer which assembles the data from the photo eyes and outputs speed signals for selected feed conveyors in the system to fill in the large space areas on the collector conveyor with parcels to achieve a selected density of a particular area at 60% or greater.

It is an object of this invention to provide a range sensing conveyor package management system which determines the percentage of surface area of the collector conveyor, singulator conveyor, and other conveyors which is covered by packages, parcels, bags, envelopes, boxes, or other articles.

It is an object of this invention to provide a range sensing conveyor package management system which counts and identify the number of items contained on a conveyor.

It is an object of this invention to provide a range sensing conveyor package management system to identify, located, or identify a package, parcel, or other item on the conveyor by its digital image or footprint.

It is an object of this invention to provide a range sensing conveyor package management system which regulates input flow to a conveyor system where a photo eye is placed at each source of input to a collector conveyor, allowing control of the speed of each input conveyor with respect to the speed of the collector conveyor to the maximize the flow of packages through the system.

It is an object of this invention to provide a range sensing conveyor package management system which forces via friction, skewed rollers, belts, or incline planes, packages to one side of a collector conveyor and causes subsequent feed conveyors to add packages to the open area beside those packages already present on the collector conveyor.

It is an object of this invention to provide a range sensing conveyor package management system which recognizes the number of objects, the average size of the objects, and the area utilization of a conveyor.

It is an object of this invention to provide a range sensing photo eye array based system used to determine the percentage surface area coverage of a singulator device.

It is an object of this invention to provide a range sensing photo eye array based system used to count the number of items contained on a conveyor.

It is an object of this invention to provide a range sensing photo eye array based system used to regulate input flow to a conveyor system, where a photo eyes are placed at each source of input flow, allowing control of each input, in respect of the maximum allowable input flow to the system.

It is an object of this invention to provide a range sensing photo eye array based system to recognize the number of objects, average size of the objects, and area utilization of a conveyor.

It is an object of this invention to provide a range sensing system that determines fullness of a conveyor system accumulation area, and also, more specifically, for fullness of a parcel singulator.

It is an object of the present invention optimize to cover maximum amount of surface of singulator.

It is an object of the present invention to provide a range sensing photo eye array based flow management system that includes a photo eye and computer processor and interface to define and control and integrate with a conveyor control system via Ethernet, WIFI, bluetooth, and other smart electronic devices such as phones, tablets, laptop computers and other visual aid computer based devices capable of communicating with a computer system.

The present invention relates to the field of using different sensing and detection methods to determine parcel flow density 1D lineal, 2D area or 3D volumetrically on a selected section of a feed conveyor and receiving conveyor and adjusting conveyor speed ratios proportioned according to ratio of desired density to current density to increase the density or volume of parcels in a selected area of the receiving conveyor.

The present range sensing system can be used in combination with a method of photo eye based bulk parcel flow management system comprising or consisting of the steps of selecting a transition zone between a feed conveyor and a receiving conveyor each one having independent drive motors; selecting a photo eye field of view of the selected transition zone; addressing an IP address to each photo eye; setting an inline feeding conveyor speed to achieve a desired conveyor area utilization on a down stream receiving conveyor. where V is velocity (conveyor speed), DO is Desired Occupancy, RCO is Receiving Conveyor Occupancy, and FCO is Feeding Conveyor Occupancy wherein occupancy comprises conveyor area, conveyor volume, or conveyor density); selecting a percentage of photo eye field of view; selecting a percentage of the feeding conveyor occupancy defined zone; selecting a percentage of the receiving conveyor occupancy defined zone; selecting a percentage of the desired occupancy after the merger; feeding parcels to the receiving conveyor occupancy defined zone; conveying parcels toward a desired occupancy zone at a selected position; and merging the parcels at a transition section between the feeding conveyor and the receiving conveyor.

Apparatus and methods used for conveying parcels and controlling the speed and directions of parcels on conveyors is disclosed in Applicant's U.S. Pat. Nos. 10,427,884 and 10,773,897 which are incorporated by reference herein. Applicant's prior patents describe camera based vision density management system, whereas the instant invention provides an alternative based on range sensing photo eyes to measure parcel density and position as an alternative to cameras.

Other objects, features, and advantages of the invention will be apparent with the following detailed description taken in conjunction with the accompanying drawings.

BRIEF DESCRIPTION OF THE DRAWINGS

A better understanding of the present invention will be had upon reference to the following description in conjunction with the accompanying drawings in which like numerals refer to like parts throughout the views wherein:

FIG. 11 is a top view of a conveyor assembly showing a package progressing forward on a feed conveyor parallel to a collector conveyor;

FIG. 12 is a top view of FIG. 11 showing a package progressing forward on a feed conveyor parallel to a collector conveyor, wherein a section of the collector conveyor is controlled to allow a space for receiving an article conveyed by the feed conveyor;

FIG. 13 is a top view FIG. 11 showing a package progressing forward on a feed conveyor parallel to a collector conveyor, wherein an article conveyed by the feed conveyor is disposed into a receiving section of the collector conveyor;

FIG. 14 is a top view of the FIG. 11 showing a package progressing forward on a feed conveyor parallel to a collector conveyor, wherein an article conveyed by the feed conveyor is fed into a position preceding a plurality of articles conveyed on the collector conveyor; and FIG. 15 is a top view of FIG. 11 showing a plurality of packages progressing forward on a collector conveyor, wherein a angled feed conveyor and side feed conveyor are controlled for insertion of a package into a vacant area of the collector conveyor.

DESCRIPTION OF THE PREFERRED EMBODIMENTS

Figure 1:
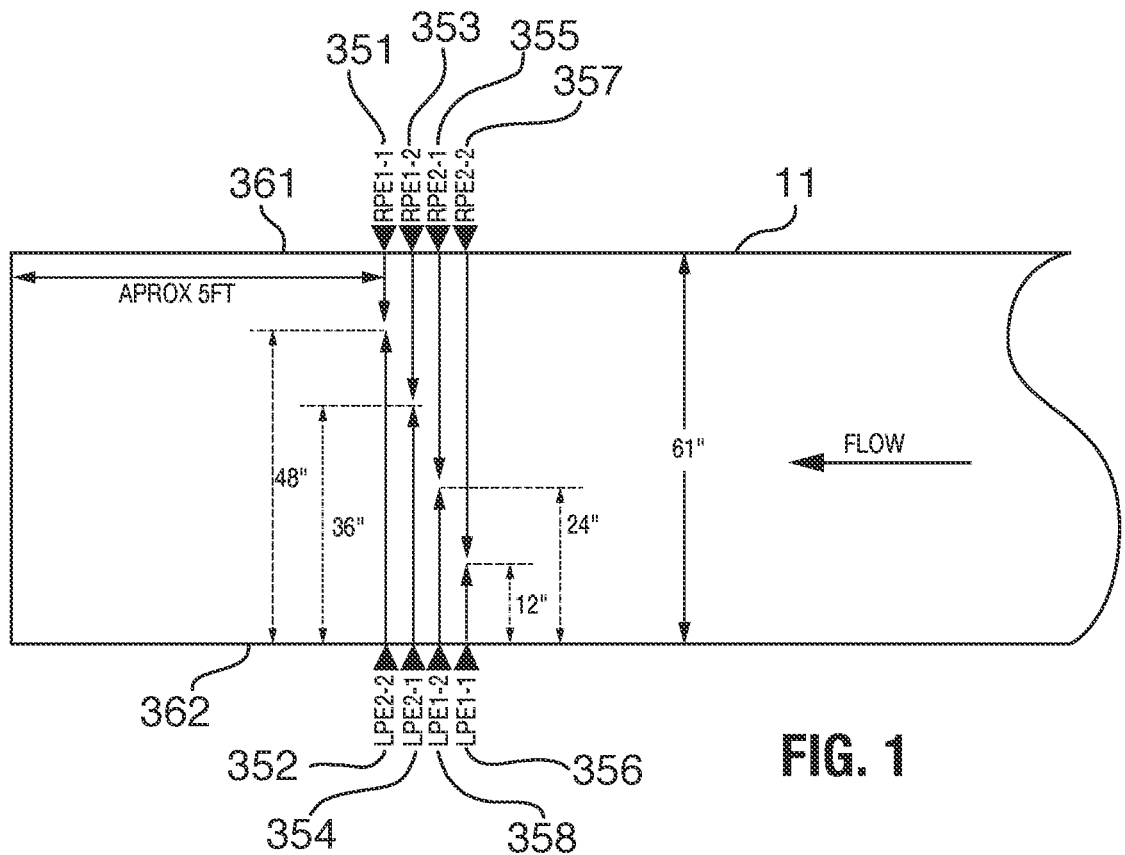
FIG. 1 is a top view of a conveyor surface wherein opposing range sensing photo eyes are installed at selected intervals on both sides of a conveyor section near the exit end creating a table of sensing or detection ranges.

In accordance with the present invention, there is provided a range sensing parcel flow management system using different sensing and detection methods to determine parcel flow density 1D lineal, 2D area or 3D volumetrically on a selected section of a feed conveyor and receiving conveyor and adjusting conveyor speed ratios proportioned according to ratio of desired density to current density to increase the density or volume of parcels in a selected area of the receiving conveyor.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of +10%.

As used herein, the term "parcel" includes articles, envelopes, mail, packages, bags, drums, boxes, or irregular shaped items or conveyed containers.

As used herein the term "range sensing" includes one or more imaging devices including a photo eye, camera, video photo eye, scanner, laser, selected light transmission frequency or wavelength or radiation detection device, or other pixel detecting and/or digital imaging devices (collectively referred to as photo eyes).

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with the present invention, there is provided a parcel flow management system based on a density based range sensing detection system that recognizes belt area utilization and parcel count.

The parcel flow management system comprises or consists of a density based detection system that recognizes conveyor surface area utilization, and parcel count. The detection system sensors are positioned at selected flow entry points across the conveyor. The control algorithm requires recognition of individual items and the rate at which individual objects are passing, and the area utilization of the conveyor surface for increasing conveyor area and controlling density. Average parcel size can be considered as well. The detection package management system may also identify, locate, or trace a package, parcel, or other item on the conveyor by its measurements and at selected positions on the conveyor.

In accordance with the present invention, there is provided a density based detection system conveyor package management system comprising, consisting of, or consisting essentially of a programmable logic controller or computer and sensors detecting parcels or package, a collector "receiver" conveyor including separate sections of the conveyor separately driven by individual motors with individual speed controllers. Selected ones of the sections of the collector conveyor have means such as low friction conveying surfaces such as skewed rollers or high friction conveying surfaces capable of urging a package to a selected side of the collector conveyor. A plurality of feed conveyors include separate sections of the conveyor separately driven by individual motors with individual speed controllers. Range detection sensors measuring the area, volume, or density of items on the conveyor surface leading up to merge areas of each of the feed conveyors with the collector conveyor. The speed of the feed conveyor and collector conveyor leading up to merge areas of each of the collector conveyor is measured, and a control program within the PLC or computer is capable of controlling speeds of the sections of the collector conveyor and of the sections of the feed conveyors based on a calculated amount of free space on a given collector section compared to a footprint of a package on an oncoming feed conveyor. A singulator conveyor may be incorporated within the conveyor system and fed by the collector conveyor.

A typical feed conveyor or collector "receiving" conveyor includes one or more separate sections of conveyors separately driven by individual motors with individual speed controllers. Selected ones of the sections of the collector conveyor may have low friction conveying surfaces such as skewed rollers arranged in configurations capable of urging a package to a selected side of the receiving collector conveyor and/or include higher friction conveying surfaces such as belts. A plurality of feed conveying surfaces may include separate sections of the conveyor separately driven by individual motors with individual speed controllers.

Detection range devices monitor areas of the collector conveyor leading up to merge areas of each of the feed conveyors with the collector conveyor, detection devices monitoring areas of the feed conveyor leading up to the merging areas of each of the feed conveyors with the collector conveyor. The bulk parcel flow management system including a programmable logic controller or computer as a control program within the computer or PLC capable of controlling the speed "velocity" of the feed and/or collector "receiving" conveyors or sections of the collector "receiving" conveyor and/or sections of the feed conveyors based on a calculated amount of free space thereon. A given collector section is compared to a footprint of a package on an oncoming feed conveyor. A calculated by photo eyes and virtual encoder creates a pulse at selected intervals to create an array to determine measured occupancy as a percentage of fullness of parcels on the feed conveyor and/or collector "receiving" conveyor.

For example, current recommended requirements for a control conveyor of a selected area and speed is 7,500 parcels per hour over 10 minutes, with two (one minute) slices at 8250 parcels per hour, (7500/12150=0.62=62% efficiency over 10 minute test). The present invention provides a means of controlling the area utilization of the available conveyor surface to obtain an efficiency of up to 75% equivalent to 9,375 parcels per hour for the same conveyor. Moreover, a 15% increase of results in an increase of 8,625 parcels per hour for the range sensing conveyor package management system conveyor with area utilization in accordance with the instant invention.

Range detection devices are positioned at selected individual input points in wired or wireless communication with a programmable logic controller, "PLC" or computer including a process control algorithm to recognize incoming flow density, in terms of both belt utilization and throughput rate. These measures can be used to make changes to reduce parcel input flow, and could require stoppage of the feed line, if flow is too sparse or dense. Similarly, absence of flow could be recognized prompting an increase in speed of a selected input conveyor or input conveyors.

The detection devices can be positioned to view the singulator surface are used in a similar matter to assess the buffer capacity utilization, primarily based on area coverage recognition. This feedback is used to dynamically adapt behavior of feed lines. The use of range detection photo eye arrays may provide added benefits in terms of system control room visibility and recordation. Variations in parameters used to tune the system can be evaluated in a more efficient manner Jams and other system problems are better recognized.

A plurality of range sensing photo eye detection devices in communication with a computer based conveyor package management system includes the number and size of the packages present a given area of an feed conveyor, collector conveyor, and optionally singulator conveyor and sorting conveyor in a package handling system wherein the data is collected and analyzed to measure the available area or space on the conveyors and the density of packages thereon to maximize a desired density of packages on selected conveyor(s). The number of feed conveyors providing packages and the conveyor speed of each is controlled as a function of occupancy on a collector or just prior to a singulator. The computer feeds the conveyor surface package density information to the conveyor speed controllers to introduce packages from one or more feed conveyors to a collection conveyor wherein packages are detected across an area, volume, or density of the conveyor surface and the speed of selected conveyors is controlled for arrangement of the packages at optimal spacing and to fill an area of the conveyor in the most efficient manner maximizing the density of the packages on a conveyor and throughput of the system and accordingly minimizing the number of conveyors required for the system. When the computer determines there is a enough space on one of the conveyor belts, for example, the collector belt, the computer tells the controller to add a package or packages by causing an feed belt to add a package or packages to the space or vacant area on the collector belt.

An algorithm is used to calculate the "measured Occupancy" whereby the sensing distance represents a percentage of belt coverage. Once the "Measured Occupancy" of the conveyor is calculated, it is compared to the "Desired Occupancy" of the conveyor surface area to determine the speed ratio of the downstream conveyor. The "Speed Ratio" is the Desired Occupancy divided by the Measured Occupancy and the speed at which to command the conveyor is then determined by the following equation where (FPM) is measured in feet per minute:

Speed of Current Conveyor(FPM)=Downstream Speed(FPM)*Speed Ratio**Power Factor

Different sensing methods are used to determine flow density 1D lineal, 2D area or 3D volumetrically on a conveyor and adjusting conveyor speed ratios proportioned according to ratio of desired density to current density to enhance the performance and throughput of conveyor systems.

The range sensing conveyor package management system for measuring and controlling density of parcels on the conveyor present invention uses different sensing and detection methods to determine parcel flow density 1D lineal, 2D area or 3D volumetrically on a selected section of a feed conveyor and/or receiving conveyor and adjusting conveyor speed ratios proportioned according to ratio of desired density to current density to increase the density or volume of parcels in a selected area of the receiving conveyor.

The 2D discrete distance measurement method uses SICK WTT190L photo eyes to create a table of sensing ranges.

TABLE I

|  | RPE1-1 | NOT RPE1-1 AND RPE1-2 | NOT RPE1-1 AND NOT RPE1-2 AND RPE2-1 | NOT RPE1-1 AND NOT RPE1-2 AND NOT RPE2-1 AND RPE2-2 | NOT RPE1-1 AND NOT RPE1-2 AND NOT RPE2-1 AND NOT RPE2-2 |
|---|---|---|---|---|---|
| LPE1-1 | 100 | 80 | 80 | 40 | 20 |
| NOT LPE1-1 AND LPE1-2 | 80 | 60 | 40 | n/a | 20 |
| NOT LPE1-1 AND NOT LPE1-2 AND LPE2-1 | 60 | 40 | n/a | n/a | 20 |
| NOT LPE1-1 AND NOT LPE1-2 AND NOT LPE2-1 AND LPE2-2 | 40 | n/a | n/a | n/a | 20 |
| NOT LPE1-1 AND NOT LPE1-2 AND NOT LPE2-1 AND NOT LPE2-2 | 20 | n/a | n/a | n/a | 0 |

Each photo eye has two outputs, each independently adjustable to obtain two unique ranges. The photo eyes are installed on both sides of the conveyor section at selected distance of about five (5) feet from the exit end of the conveyor as shown in FIG. 1. Optionally a plurality of photo eyes may be installed in a bank or array.

As shown in FIG. 1, a first side 361 of the conveyor having a width of 61 inches includes a photo eye 351 which measures a range across the conveyor of up to 13 inches and the opposing photo eye 362 on the opposing second side 362 of the conveyor measures a distance of up to 48 inches. A photo eye 353 on the first side of the conveyor measures a range across the conveyor of up to 25 inches and the opposing photo eye 364 on the opposing second side of the conveyor measures a distance of up to 36 inches. A photo eye 355 on the first side of the conveyor measures a range across the conveyor of up to 37 inches and the opposing photo eye 366 on the opposing second side of the conveyor measures a distance of up to 24 inches. A photo eye 357 on the first side of the conveyor measures a range across the conveyor of up to 49 inches and the opposing photo eye 358 on the opposing second side of the conveyor measures a distance of up to 12 inches.

A virtual encoder is programmed for the conveyor section to produce a pulse at selected intervals, for example at two inch intervals of belt motion. An array is created to represent the final five feet of the feed conveyor section, plus an additional five feet onto the receiving collector conveyor or downstream conveyor section, or 120 inches. With each element of the array representing a two inch section, or one pulse of the virtual encoder, the total number of array elements at the conveyor transition sixty array elements.

Dependent upon the combination of photo eye outputs blocked when an encoder pulse occurs, a "measured occupancy" value is populated in the current array element. The "measured occupancy" is a percentage of fullness, 0 being an empty belt or no blocked photo eyes, and a 100 being all photo eyes blocked. The photo eyes are re-evaluated at each encoder pulse and the result is populated into the current array position. The overall measured occupancy of the 10 foot section of conveyor (5 feet on the exit of the current belt and 5 feet on the entry of the downstream belt) is found by adding all of the values in the array together, then dividing by the total number of array elements.

The following table describes how the combination of blocked photo eyes yields the proper measured occupancy to populate in the array:

As shown in Table I, the first left side photo eye status is resolved first. Then the second right side photo eye status is resolved to yield the percentage of fullness at the encoder pulse, as represented by the values in the chart. Once the proper combination has been found, the algorithm ends and the resulting value is then placed in the current array element. The algorithm stores the last sixty values, adds them all together, then divides by the total number of array elements to get the average measured occupancy represented as a percentage, ranging from 0 to 100. Note that the "n/a" in the chart above means that condition cannot exist with the photo eye ranges adjusted as shown in the diagram.

Once the measured occupancy of the belt is calculated, it is compared to the "Desired Occupancy" of the belt, which can then be calculated to determine the Speed Ratio of the downstream belt. The "Desired Occupancy" is a configurable parameter. It is expected to be in the range of 30% to 40% but the final value must be determined in the field. The Speed Ratio is the Desired Occupancy divided by Measure Occupancy. So if the Desired Occupancy is 30% and the Measured Occupancy is found to be 70%, then the Speed Ratio is 30/70 or 0.429. The speed at which to command the belt is then determined by the following equation:

Speed of Current Belt(FPM)=Downstream Speed (FPM)*Speed Ratio**PowerFactor

PowerFill 2D Using IO-Link Based Analog Distance Sensing Range

Figure 2:
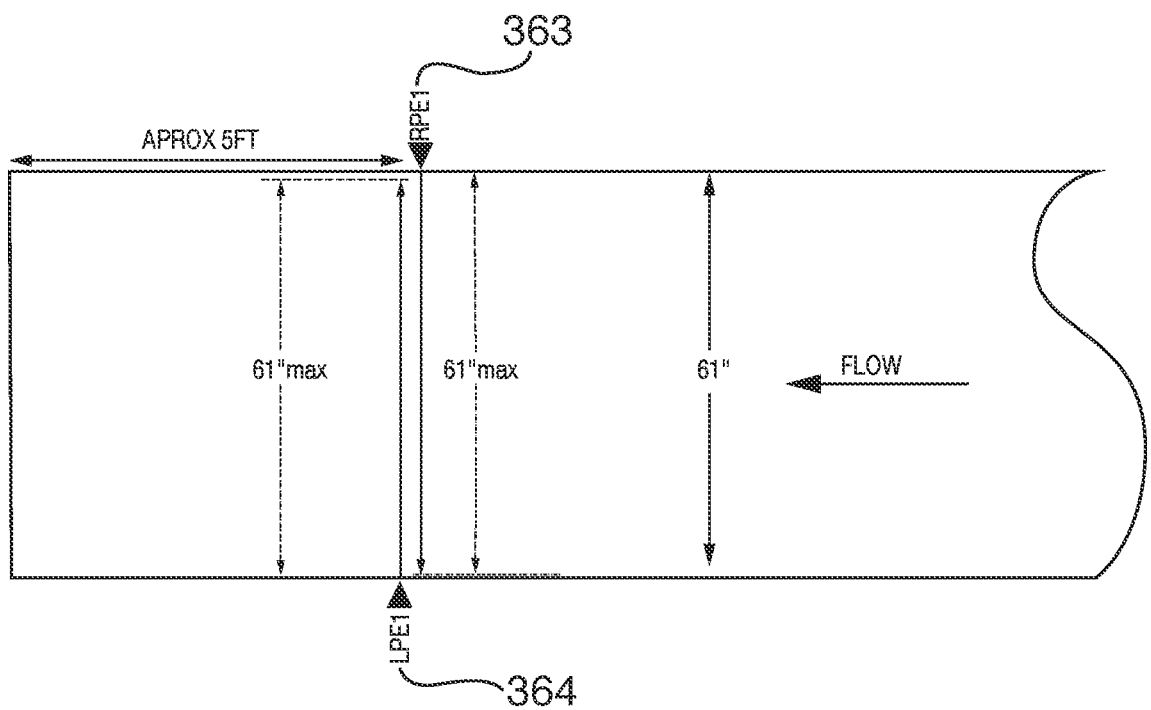
FIG. 2 shows a density measurement method using range sensing photo eyes to output an actual analog distance. using a sensor with analog output where a true distance from the edge of the belt to the sensed parcel is known and a distance sensing photo eye on both sides of the belt is used to negate the effect of parcels justified to one side.

The following density measurement method example uses the BALLUFF BOD0020 photo eyes which output an actual analog distance. By using a sensor with analog output, a true distance from the edge of the belt to the sensed parcel is known. A distance sensing photo eye is still needed on both sides of the belt to negate the effect of parcels justified to one side. The sensing distance is set to a maximum of the conveyor width as shown in FIG. 2 wherein LPE1 is designated as 364 and RPE1 is designated as 363.

A virtual encoder is programmed for the conveyor section to produce a pulse at two inch intervals of belt motion. An array is created to represent the final five feet of conveyor section, plus an additional five feet onto the downstream conveyor section, or 120 inches. With each element of the array representing two inches, or one pulse of the virtual encoder, the total number of array elements at the conveyor transition is sixty (60) array elements.

The algorithm to calculate "measured occupancy" is calculated and compared to the "Desired Occupancy" of the belt which can be calculated to determine the Speed Ratio for the downstream belt. The sensing distance represents a percentage of belt or "conveyor surface area" coverage. A parcel that is detected at sixty inches will yield a percentage close to 0%, whereas a parcel that is detected 1 or 2 inches will yield a percentage close to 100%. To obtain the "measured occupancy", a combination of the distances sensed by both photo eyes must be used to generate an accurate occupancy across the belt. This value is calculated at each virtual encoder pulse and placed in the overall measured occupancy array. The photo eyes are re-evaluated at each encoder pulse and the result is populated into the current array position. The overall measured occupancy of the ten foot section of conveyor (five feet on the exit of the current belt and five feet on the entry of the downstream belt) is found by adding all of the values in the array together, then dividing by the total number of array elements.

Once the measured occupancy of the belt is calculated, it is compared to the "Desired Occupancy" of the belt, which can then be calculated to determine the Speed Ratio of the downstream belt. The "Desired Occupancy" is a configurable parameter. It is expected to be in the range of 30% to 40% but the final value must be determined in the field. The Speed Ratio is the Desired Occupancy divided by Measure Occupancy. So if the Desired Occupancy is 30% and the Measured Occupancy is found to be 70%, then the Speed Ratio is 30/70 or 0.429. The speed at which to command the belt is then determined by the following equation:

Speed of Current Belt(FPM)=Downstream Speed (FPM)*Speed Ratio**Power Factor

As noted heretofore, a Power Factor can be utilized in the equation above as a configurable parameter and can set how aggressive the Current Belt Speed will go for larger corrections. A large power factor means more aggressive correction. For PowerFill two dimensional area "2D" the power factor is set can be set to 1.

For instance, sensing methods to determine flow density in lineal area, "1D", or in two dimensional area "2D", or density defined volumetrically "3D", is determined and adjusting conveyor speed ratios proportioned according to ratio of desired density to current density.

Figure 3:
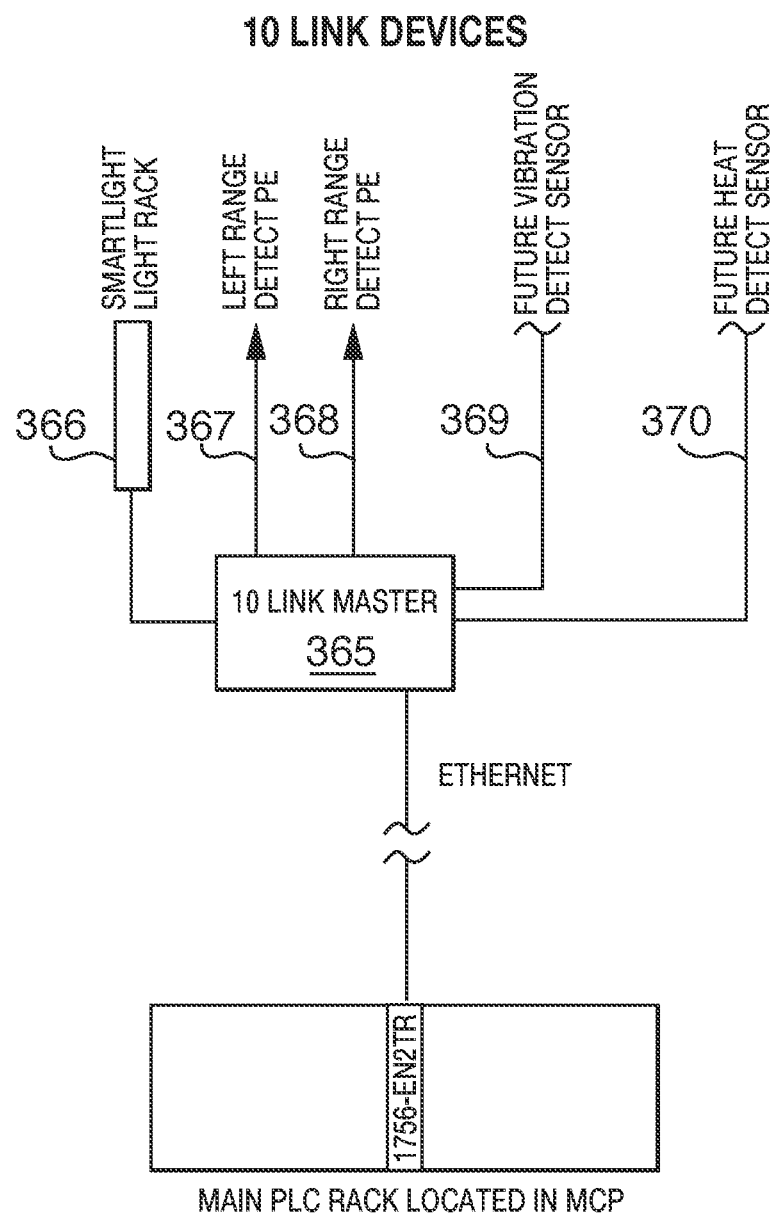
FIG. 3 shows the architecture for IO-Link based range sensing photo eyes for area.

The analog signal obtained from the photo eyes are the IO-Link, so the main PLC will get the distance information from the photo eyes via Ethernet. The architecture for IO-Link based PowerFill 2D is shown in FIG. 3. The IO-Link 365 devices include a left range detect photo eye 366, a right range detect photo eye 367, an optional smartlight stack 368, an optional vibration detection sensor 369, and an optional heat detection sensor 370. It is contemplated that other sensors known in the art may be linked as well.

The IO-Link Master has the following features useful to the PowerFill 2D application:

The IO-Link Master is a field-mounted device. The sensors plug directly into the unit via standard 5-pin Euro-Style cord sets. It connects back to the PLC via Ethernet. It allows the capability to plug in other IO-Link input devices, such as temperature and vibration sensors. It allows the capability to plug in IO-Link output devices, like the SmartLight shown above. The SmartLight can be configured in multiple colors, multiple flashing or static configurations, etc. The sensors have diagnostic capabilities over the IO-Link to the PLC so that a photo eye that is becoming dirty can be annunciated on the HMI (and on the SmartLight). The configuration parameters to set up the devices (such as range and output units) are stored in the PLC so device replacement requires no setup once the device has been replaced.

Figure 4:
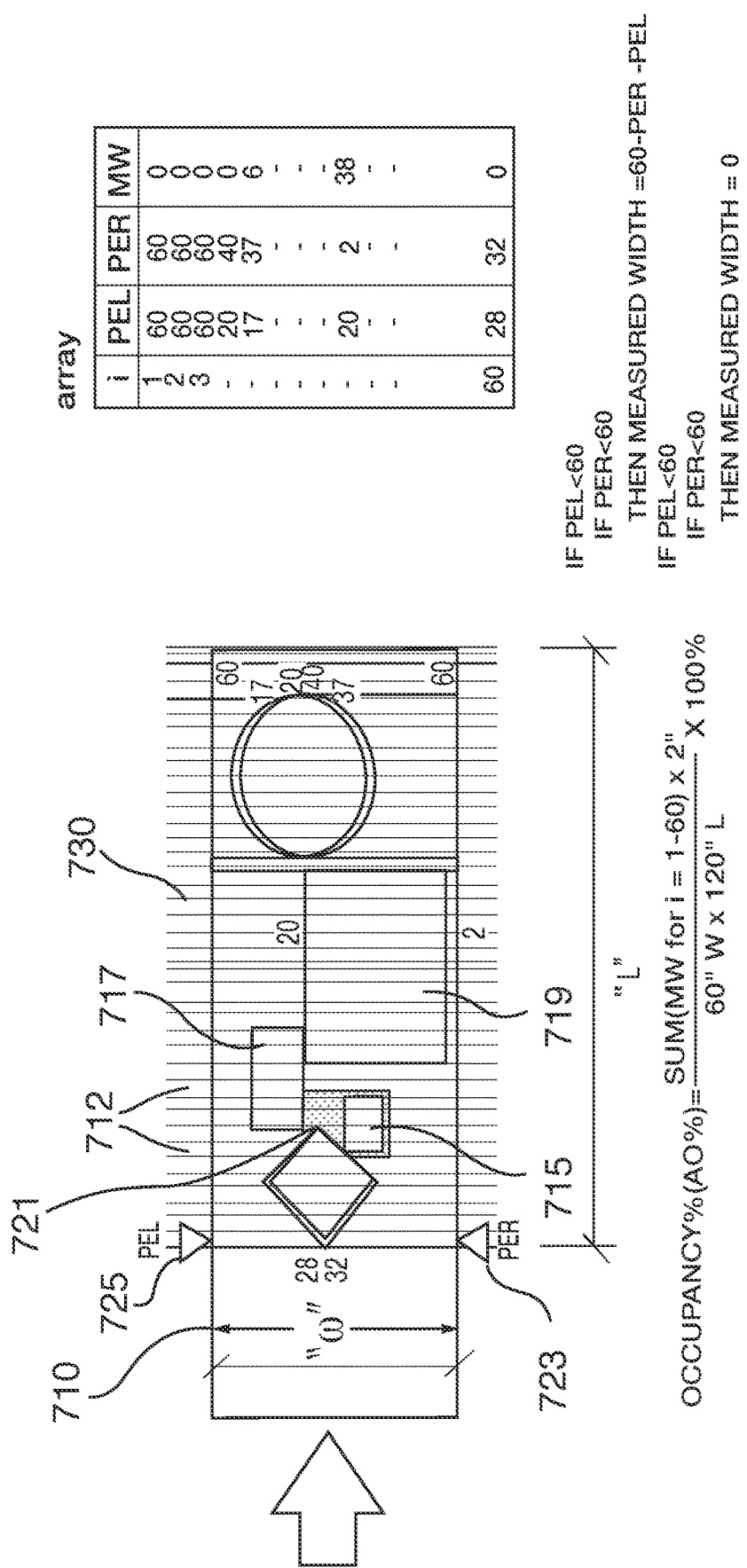
FIG. 4 shows a conveyor section with an assortment of parcels having different shapes and sizes thereon passing through a plurality of encoder pulse locations wherein photo eye right (PER) oppose photo eye left (PEL) locations and the conveyor has a width of 60 inches a 120 inch length segment is broken up into 2 inch interval measurements as tabulated in the array.

As shown in FIG. 4, a conveyor section with an assortment of parcels having different shapes and sizes thereon passing through a plurality of encoder pulse locations 730 wherein photo eye right (PER) oppose photo eye left (PEL) locations and the conveyor has a width of 60 inches a 120 inch length segment is broken up into 2 inch interval measurements as tabulated in the array. More particularly, a conveyor 710 having a width "W" of about 60 inches includes a 120 inch long measurement zone "L" broken into 2 inch measurements or segments 712 each one representing an encoder pulse location wherein a right photo eye (PER) 723 and opposing left photo eye (PEL), 725 is affixed to the conveyor just above the surface to complete circuit extending therebetween of light such as infrared light or other radiation means for detecting an article positioned between the opposing PEL and PER. A plurality of packages or parcels resting on the conveyor in the measurement zone L include a square box 713, a first small rectangular box 715, a second medium size rectangular box 717, a large rectangular box 719, a circle 720, and an interior space 721 representing measurement errors (which are not significant). The actual occupancy is determined by the following formula:

$$\text{ACTUAL OCCUPANCY } \%(AO\%) = \frac{SUM(MW \text{ for } i = 1\text{-}60) \times 2''}{60'' W \times 120'' L} \times 100\%$$

$$\text{Actual Occupancy } \%(\text{Area Occupied } \%) = \frac{SUM \text{ (Measured Width for increments is 1-60)} \times 2 \text{ in}}{60 \text{ inches } W \times 120 \text{ inches } L} \times 100\%$$

The Array shows actual values determined for the area of the articles on the conveyor.

As shown in the Array:

If PEL<60 and PER<60, the measured width=60−PER−PEL

If PEL>60 and PER>60, then measured width=0

Figure 5:
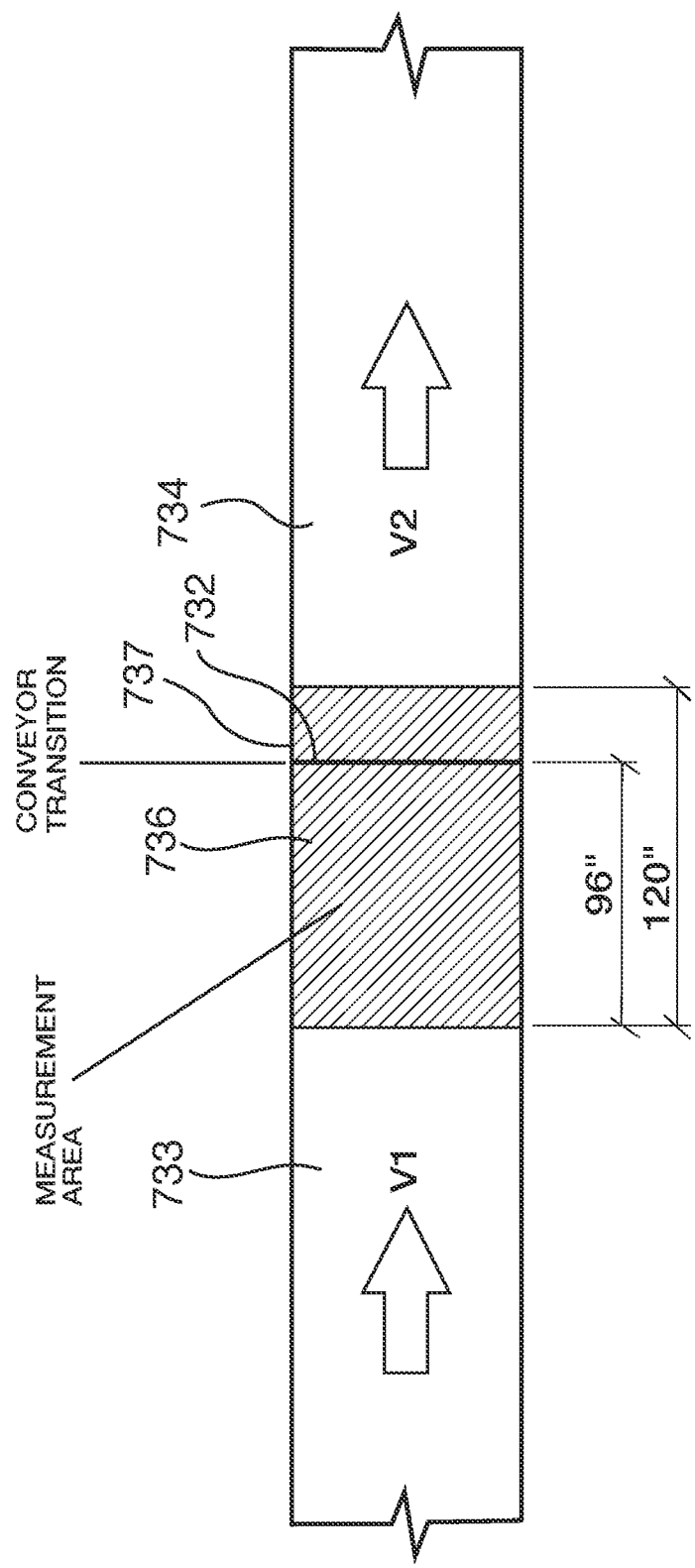
FIG. 5 is a 2D Series conveyor system showing the feed conveyors and receiving conveyors wherein the roller or belt conveyors utilize independent motors to convey, arrange, and separate parcels and that the principle of the conveyor area utilization, and parcel count utilizing a system with range sensing photo eyes positioned at flow entry points of selected conveyors can be controlled to efficiently feed a receiving conveyor.

A 2D Series conveyor system is shown in FIG. 5, wherein a feed conveyor 733 and receiving conveyor 734 include roller or belt conveyors utilizing independent motors to convey, arrange, and separate parcels and that the principle of the conveyor area utilization, and parcel count utilizing a system with range sensing photo eyes positioned at flow entry points of selected conveyors can be controlled to efficiently feed a receiving conveyor. The conveyor transition section 732 is shown where the conveyors merge. The feed conveyor moves at rate or velocity V1 and the receiving conveyor moves at a rate or velocity of V2. The area of measurement (totaling 120 inches) includes a major portion (96 inches in length) of the distal end section 736 of the feed conveyor and continues and includes a minor portion (24 inches in length) of the distal end section of the receiving conveyor 737 according to the following formula:

$$\text{RATIO} = \frac{V1}{V2} = \frac{DO\%}{AO\%}$$

-continued $$\text{SPEED } V1 = \frac{DO\%}{AO\%} \times V2$$

Where:

DO % is desired occupancy percentage (aka conveyor area utilization)

AO % is actual occupancy percentage (aka measured conveyor area utilization)

Figure 6:
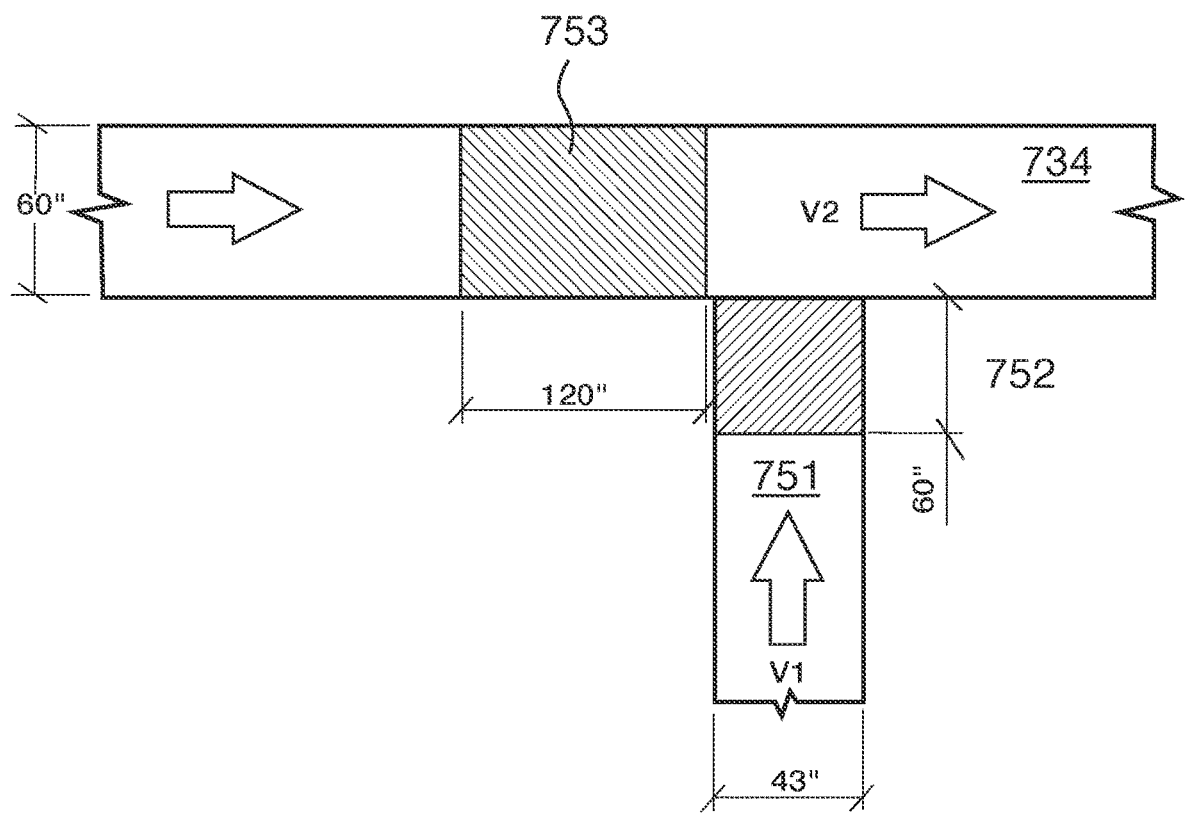
FIG. 6 is 2D feed and collector conveyor application showing the merger of a side transfer feed conveyor with an intersecting collector conveyor wherein the rate of speed of the conveyors is set to achieve a desired conveyor area utilization on the downstream portion of the collector conveyor, based on a range sensing photo eye system of the intersection based on the receiving conveyor occupancy.

FIG. 6 illustrates a side transfer feed conveyor conveying articles which intersect the flow through collection conveyor at a 90 degree angle. Of course, the intersect angle is a matter of choice and may at any angle up to 90 degrees. The side feed conveyor is shown where an article is fed to the receiving or collecting conveyor wherein the speed of the side feeder conveyor is controlled to achieve desired conveyor area utilization on the receiving collection conveyor. The speed of the feed conveyor, the receiving conveyor or both the feed and receiving conveyors are determined by the array of photo eyes measurement at a selected belt area measurement location which includes both the feeding conveyor occupancy defined zone and the receiving collector conveyor occupancy defined zone wherein the desired occupancy zone 19 after the merger has an increased density in the selected area after the merge of the articles.

As shown in FIG. 6, the 2D feed and collector conveyor application shows the merger of a side transfer feed conveyor with an intersecting collector conveyor wherein the rate of speed of the conveyors is set to achieve a desired conveyor area utilization on the downstream portion of the collector conveyor, based on a range sensing photo eye system of the intersection based on the receiving conveyor occupancy. Collector conveyor 734 is traveling at a rate (velocity) of V2 and has a selected measurement area 753 of 120 inches (the measurement area can be adjusted based on conveyor capacity, occupance and velocity).

The collector conveyor 734 is 20% occupied which is 50% of the desired occupancy (40% full equal to 50% of target area utilization), prior to the intersection of the feed conveyor 751. The feed conveyor 751 is traveling at a rate (velocity) of V1 and has a selected measurement area 752 of 60 inches. The feed conveyor distal end portion is loaded to cover 50% of the measurement area 752. The speed or velocity of the feed conveyor V1 can be calculated by a formula whereby the desired occupancy (DO) and (actual occupancy (AD) are expresses as follows:

$$\text{RATIO} = \frac{V1}{V2} = \frac{(DO\% - A1O\%) \times A1}{A2O\% \times A2}$$

$$\text{SPEED } V1 = \frac{(DO\% - A1O\%) \times A1}{A2O\% \times A2} \times V2$$

Where

DO % is desired occupancy percentage (aka conveyor area utilization)

AO % is actual occupancy percentage (aka measured conveyor area utilization)

EX. Approaching collector belt area is 20% occupied and target collector fullness is 40% or half the target area utilization. Loading on end portion of feed (5 ft is chosen for this case) conveyor is measured to cover 50% of area.
A1=60×120=7200 in^2
A1O %=20
A2=43*60=2580 in^2
A2O %=50
DO %=40

$$\text{SPEED } V1 = \frac{(40-20) \times 7200}{50 \times 2580} \times V2 = 1012 \times V2$$

As shown in FIGS. 7-15, the parcel flow management system comprises or consists of a density based detection system compatible with a conveyor system having multiple sections 10 including a plurality of conveyor modules or sections with belts and/or conveyor rollers for transporting and separating articles such as envelopes, mail, parcels, packages, bags, drums, boxes, or irregular shaped items thereon. As shown, a linear parcel singulator 8 and recirculating conveyor 14 are in flow communication therewith. A plurality of photo eye arrays provide a filed of view of selected occupancy defined zones such as the transition area 70 (measurement area 15 and 17 or transition point of merger of articles from one conveyor 11 to another conveyor 13. Independent motors drive the conveyor modules or sections creating zones that can be accessed for a particular photo eye via the assigned IP address.

At least range sensing photo eye array, one photo eye, camera, video camera or other pixel detecting and/or digital imaging devices is positioned at each individual input point, with a control algorithm to recognize incoming flow density, in terms of both belt utilization and throughput rate. These measures can be used to make changes to reduce parcel input flow, and could require stoppage of the feed line, if flow is too dense. Similarly, absence of flow could be recognized prompting an increase in speed of the input conveyor.

As noted previously, the method of detecting and measuring the density of parcels on a selected section of a conveying surface, comprises or consists of the steps of creating a table of sensing range with a plurality of photo eyes, wherein each photo eye has two outputs and each one is independently adjustable to obtain two different ranges. The array 20 includes a plurality of photo eyes is installed on a first side and an opposing second side of a selected section of a feed conveyor and a receiving conveyor at a selected distance from an discharge end of the feed conveyor and a receiving end of the receiving conveyor. A pulse is produced at selected intervals along the selected section of the conveying surface with a programmable virtual encoder. The array 20 is formed including a plurality of array elements (photo eyes). Each of the array elements representing one pulse of the virtual encoder defining a selected length of the selected distance. The average measured occupancy of the array is calculated by determining the combination of photo eye outputs blocked when an encoder pulse occurs representing a percentage of fullness of the receiving conveyor with a programmable logic controller using an algorithm. The virtual encoder is programmable to produce a pulse at selected intervals of the feed conveyor. The array 20 elements represent one pulse of the virtual encoder defining a selected length of the selected distance. A programmable logic controller having an algorithm for calculating the average measured occupancy of the array representing a percentage of fullness of the receiving conveyor. The measured occupancy to a desired occupancy of the feed conveyor is compared to the receiving conveyor. A speed ratio is calculated by dividing the desired occupancy by the measured occupancy. The speed of the feed conveyor V1 (velocity 1), the receiving conveyor speed V2 (velocity 2), or the feed conveyor and the receiving conveyor is regulated to obtain a desired occupancy on the receiving conveyor.

Photo eyes positioned to view the singulator surface are used in a similar matter to assess the buffer capacity utilization, primarily based on area coverage recognition. This feedback is used to dynamically adapt behavior of in-feed lines. The use of range detection photo eye arrays provides added benefits in terms of system control room visibility. Variations in parameters used to tune the system can be evaluated in a more efficient manner. Jams and other system problems are better recognized.

Figure 7:
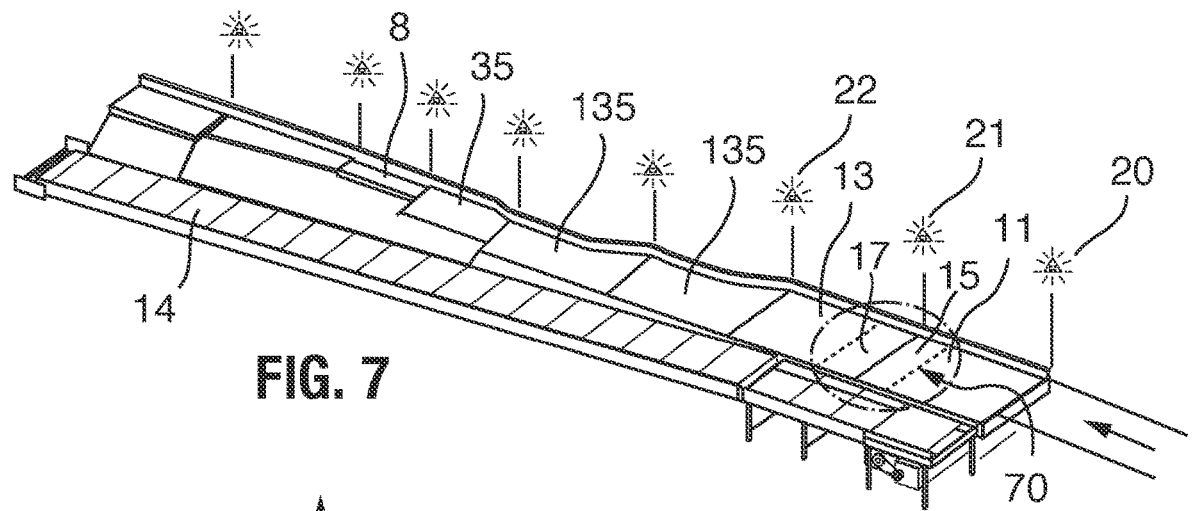
FIG. 7 is a perspective view of a range sensing based conveyor package management system of the present invention showing a range sensing photo eye field of view of the bulk parcel flow management system where the inline conveyor speed is set to achieve a desired conveyor area utilization on a down stream conveyor including a singulator.
Figure 8:
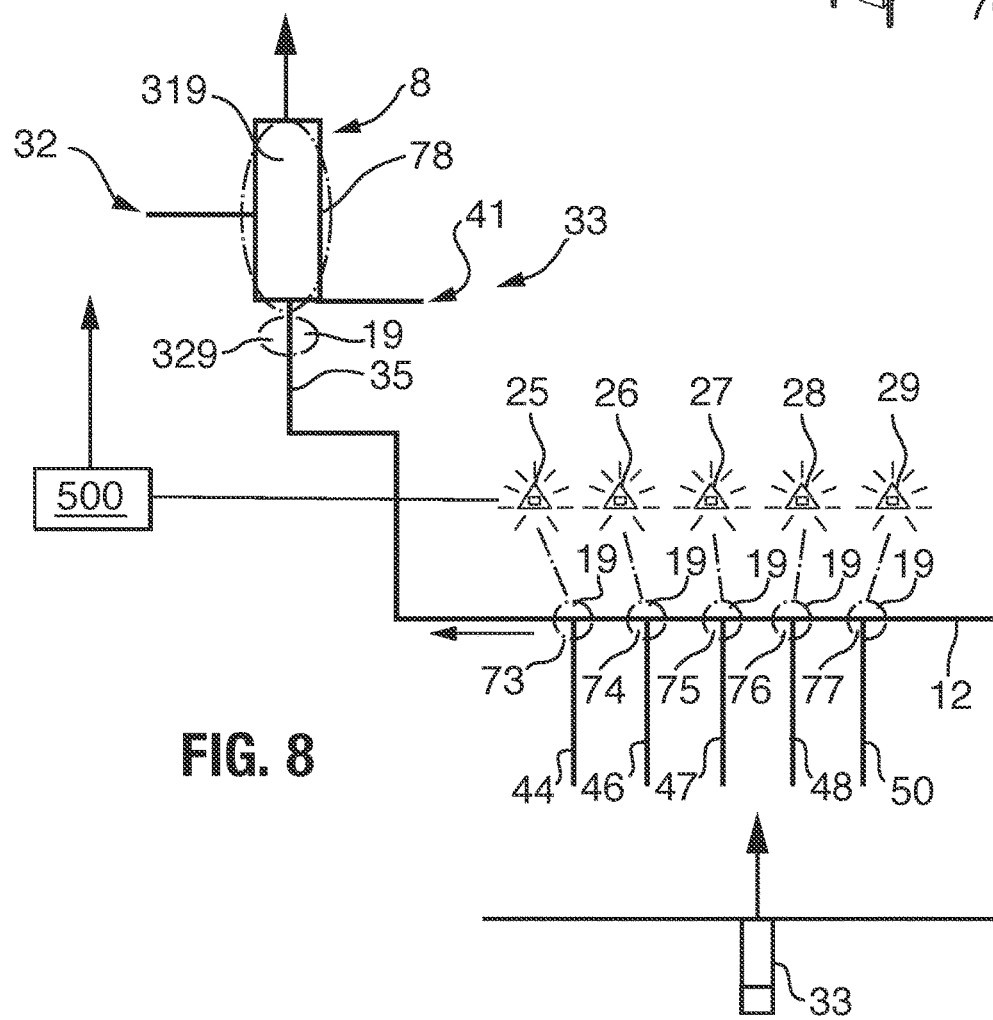
FIG. 8 is a schematic showing the range sensing density flow management system applied to a bulk feed system from the trailer dock to the sorter including a control system regulating a plurality of individual inputs based on the conveyor fullness at various positions and the singulator fullness wherein the conveyor speeds are regulated as a function of singulator fullness and incoming occupancy.

In one preferred embodiment as shown in FIG. 7, a range sensing photo eye array and computer based conveyor package management system includes range sensing arrays of photo eyes monitoring the number and size of the packages present on the infeed conveyors 11, 13, 135 and 35, recirculating collector conveyor 14, singulator conveyor 8 and/or sorting conveyor in a package handling system wherein the photo eyes data is used to measure the available area or space or volume on the conveyors to maintain a desired density of packages on selected conveyor(s). The conveyor speed is controlled as a function of occupancy on a collector or just prior to a target conveyor such as the singulator. The computer feeds the information to the conveyor speed controllers to introduce packages from a transport 33 to one or more feed conveyors 44, 46, 47, 48, 50 to a collection conveyor 12 as shown in FIG. 8, wherein packages are detected by one or more photo eyes arrays 25, 26, 27, 28, 29 and the speed of selected conveyors and/or the velocity of the packages or articles is controlled for arrangement of the packages at optimal spacing maximizing the density or volume of the packages on a given conveyor area and throughput of the system and accordingly minimizing the number of conveyors required for the system. When the computer determines there is a enough space on one of the conveyor belts, for example, the collector belt, the computer tells the controller to add a package or packages by causing an infeed belt to add a package or packages to the space or vacant area on the collector belt.

It is contemplated that a line-scan photo eyes having a single row of pixel sensors can be utilized in the instant invention. The lines are continuously fed to a programmable controller, programmable logic controller (PLC), or a computer that joins them to each other and makes an image. Multiple rows of sensors may be used to make colored images, or to increase sensitivity by TDI (Time delay and integration). Traditionally maintaining consistent light over large 2D areas is quite difficult and industrial applications often require a wide field of view. Use of a line scan photo eyes provides even illumination across the "line" currently being viewed by the photo eyes. This makes possible sharp pictures of objects that pass the photo eyes at high speed and be used as industrial instruments for analyzing fast processes. It is contemplated that a 3D photo eyes system utilizing one or more photo eyes or other pixel detecting and/or digital imaging devices may also be used to detect the height of the packages and determine volume density.

The photo eyes based density measurement system recognizes and maximizes belt area utilization of the feed conveyor. An array including a plurality of photo eyes can be positioned at selected points of the feed conveyor and the receiving end of the receiving conveyors. A computer with a control algorithm recognizes individual items area, foot print of the items and the rate at which individual objects are passing, and the area utilization of the feed conveyor. The range sensing photo eyes and computer based conveyor package management system monitor and control the speed of the feed conveyor based on the number and size of the packages present on the feed conveyor. Information from the receiving conveyor and collector conveyor or singulator conveyor and/or sorting conveyor in a package handling system may also be utilized wherein the photo eyes data is used to measure the available area or space or volume on the conveyors to maintain a desired density of packages on selected conveyor(s). The conveyor speed is controlled as a function of occupancy on a collector or just prior to a slide sorter conveyor, singulator, or receiver conveyor.

The range sensing parcel flow management system comprises or consists of a section 10 of a conveyor system wherein a plurality of photo eyes 20 detect parcels upon the primary or main conveyor collector conveyor which incorporate at least one feed conveyor 11 and one receiving conveyor 13 used in conjunction with a singulator 8, hold-and-release conveyor, accumulator, and/or strip conveyor typically downstream from the feed conveyor 11 which are shown in linear alignment with a singulator 8. The conveyors utilize roller and/or belts and each unit is powered by at least one independent motor to convey, arrange, and separate parcels at selected rates activation or of speed based upon desired occupancy of one or more selected conveyors. Thus, the degree of occupancy can be controlled on each conveyor independently of an adjacent conveyor upstream or downstream and the plurality of conveyors in the conveying system can be started, stopped, or the speed can be increased or decreased in order to increase the area of occupancy for a particular conveyor. The conveyor system sections utilizes independent motor driven conveyor zones.

The conveyor system section 10 includes at least one feed conveyor 11 and a downstream receiving conveyor 13. The selected inline feed conveyor speed is set to achieve a desired conveyor area utilization on the selected down stream receiving conveyor 13. A photo eye 20 is utilized to present a field of view of the feed conveyor occupancy zone 15 established for a given velocity V2 of parcels fed to the receiving conveyor occupancy defined zone 17 as the parcels are conveyed toward a concentrated desired occupancy zone 19 at a selected position after the transition section, zone, or point 70 where the feed conveyor 11 and receiving conveyor 13 merge.

The range sensing photo eye array parcel flow management system is applicable to a bulk feed system from the point of unloading of articles from trailers onto induction conveyors through the separation and sorting process. As shown in FIG. 8, articles unloaded from a truck 33 are off loaded from any one of a plurality of unloading induction conveyors 44, 46, 47, 48, and 50 whereby the rate of speed of the conveyers 44, 46, 47, 48, and 50 and the collection conveyor 12 are regulated by photo eyes 26, 27, 28, and 29 providing a photo eyes field of view at the merger or respective transition points 73, 74, 75, 76, and 77 of the induction feed conveyors 44, 46, 47, 48, and 50 and a collector conveyor 12. The collector belt 12 may be devoted to off-loading induction conveyors or flow from other sources such as a recirculating conveyor 14 from a sorter area due to output lanes which are full. The induction feed conveyor(s) 44, 46, 47, 48, and 50 are regulated as a function of collector conveyor 12 speed and percent of occupancy of articles on the collector conveyor 12. An accumulating conveyor or accumulator 35 may be positioned up stream of the singulator 8 and down stream from the collector conveyor 12 and utilized as a receiving conveyor. The movement of the feed and/or collector conveyors may be regulated as a function of the accumulator conveyor 35 just prior to the singulator and is based on the area of the conveyor occupied with packages in order to provide a smooth feed to the singulator 8. A downstream singulator 8 includes an array of singulator photo eyes 32 providing a field of view 319 of articles on the singulator 8 and a photo eye array 41 providing a field of view 329 of the articles merging at transition point 78 with the singulator 8 fed from the adjacent accumulator conveyor 35.

A computer or microprocessor control system 500 controlling the range sensing photo eye array based bulk parcel flow management system regulates a plurality of individual inputs based on the singulator fullness. The conveyor speeds of the feed conveyors 11, induction conveyors 44, 46, 47, 48, and 50, collector conveyors 12, recirculating conveyor 14, singulator 8, and accumulator 35 can be controlled and regulated as a function of the singulator fullness and incoming percent occupancy.

The range sensing photo eye array includes at least a pair of opposing smart photo eye modules 20 capable of processing range sensing data and determine the distance across the conveyor within defined zones which can be adjusted for each photo eyes by zooming in or out or by selecting a particular array or area on a smart device to determine the optimum conveyor speed. The smart photo eyes modules process range sensing data and determine occupancy percentage within the defined zones. A photo eyes IP address is designated for each photo eye array 20. For instance, the photo eyes can be programmed or set up so that a simple "right click" defines the photo eyes IP address. An ethernet system provides means for transmitting a signal to a computer via a command PC, PLDC, or VLC control system for calculating percent of occupancy information and calculating the desired conveyor speeds. Interface is accomplished via smart phone, tablet, laptop, smart watch, stand alone terminal and/or network. The configuration software provides a convenient interface to configure control zones and input control parameters. Individual photo eyes IP addresses are assigned to each photo eyes in the range sensing photo eye array system.

The bulk parcel flow management system includes means to open a configuration window to define "oversight" parameter and define zones where occupancy is to be measured at any time for any range sensing photo eye array occupancy defined zone.

The control algorithm requires recognition of individual items and the rate at which individual objects are passing, and the area utilization of the collector belt. Average article size and shape can be considered as well. The photo eye array and computer based conveyor package management system monitors the number and size of the packages present on the infeed conveyors, collector conveyor, singulator conveyor and sorting conveyor in a package handling system wherein the photo eyes data is used to measure the available area or space on the conveyors to maintain a desired density of packages on selected conveyor(s). It is even possible to trace and/or trace individual articles by their labels, code, or physical characteristics from the receipt of the article from the unloading truck and unloading dock to the point of the distribution vehicle.

Figure 9:
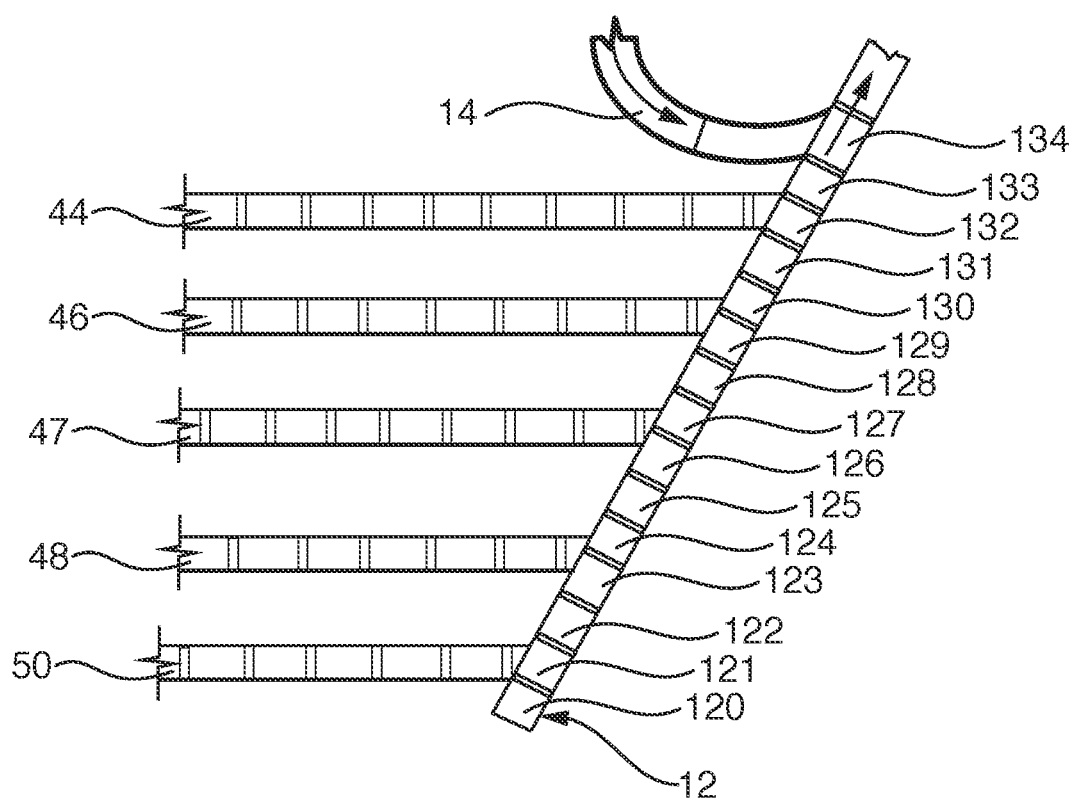
FIG. 9 is an overhead view showing the camera sensing parcel flow management system from the trailer unloading feed conveyors through the singulator and including a recirculating loop.

As shown in FIG. 9, packages are off loaded from a cargo carrier onto a selected induction feed conveyor 44, 46, 47, 48, and 50 in flow communication with a collector conveyor 12 composed of modular units of sections of conveyor 120-134. For example, induction feed conveyor 50 intersects with and feeds articles onto collector conveyor section 121, induction feed conveyor 48 intersects with and feeds articles onto collector conveyor section 124, induction feed conveyor 47 intersects with and feeds articles onto collector conveyor section 127, feed conveyor 46 intersects with and feeds articles onto conveyor section 129, and feed conveyor 44 intersects with and feeds articles onto collector conveyor section 132. The recycling or recirculating conveyor 14 intersects with and feeds into conveyor section 134. Photo eye arrays 20 can be installed at any intersection of the conveyors to control the density of the downstream conveyor.

Figure 10:
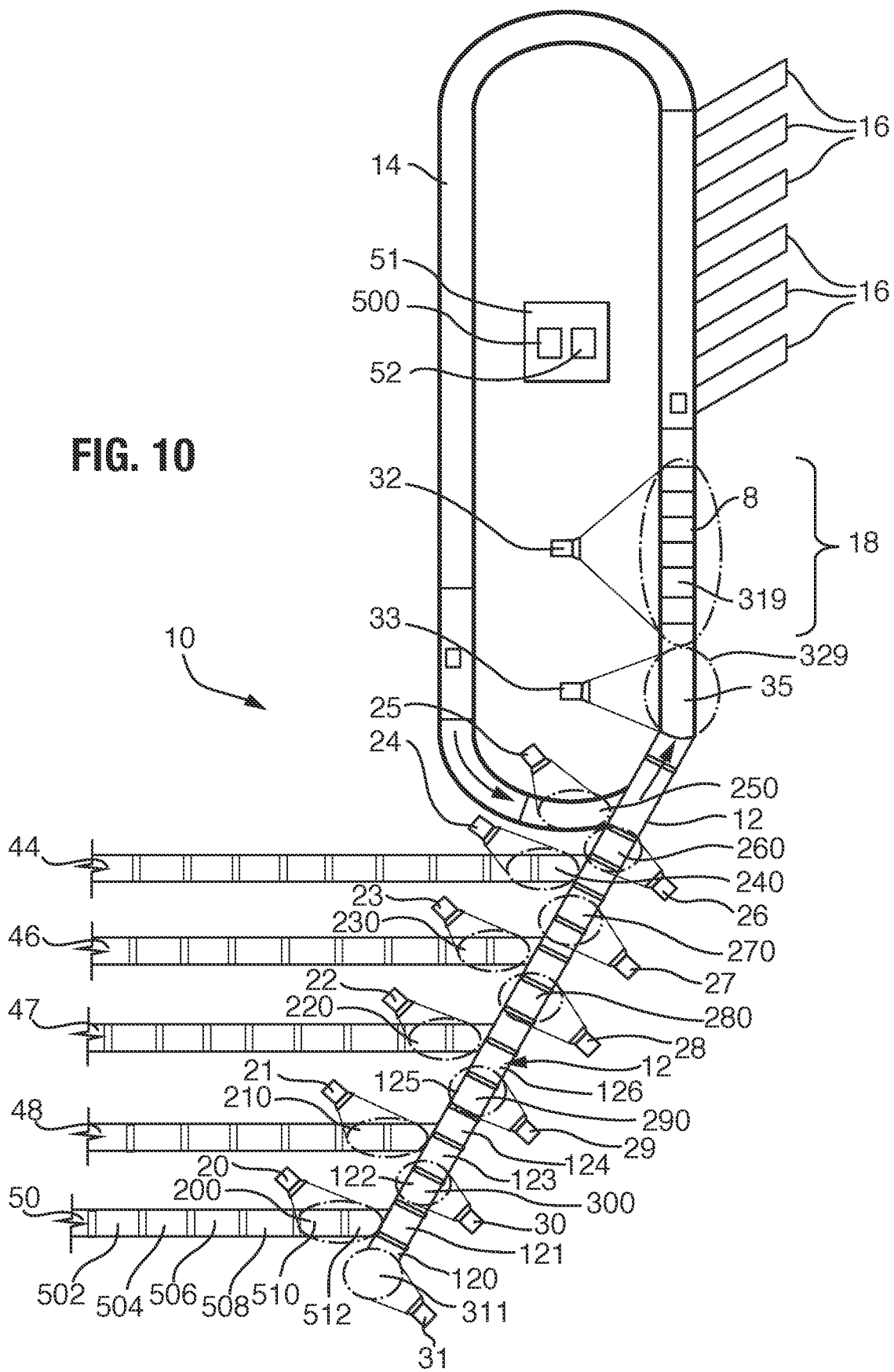
FIG. 10 shows the feed conveyors merging with the collector conveyor comprising modular sections and photo eye range sensing arrays at the intersection of each conveyor.

In accordance with FIG. 10, the collecting conveyor 12 starts at the first feed conveyor 50 and extending to an accumulator 35 and/or singulator 8 intersecting a selected number of inductor feed conveyors 44, 46, 47, 48, and 50. The recycle conveyor 14 also feeds articles onto the accumulator 35 or other conveyor intersecting with the collecting conveyor 12 prior to the singulator conveyor 8. The inductor feed conveyors include a selected number of modules or sections. For example, sections 502, 504, 506, 508, 510, and 512 are sections of the inductor feed conveyors which include at least one transition point wherein the selected inductor feed conveyor speed is set to achieve a desired conveyor area utilization on the selected down stream receiving conveyor 13 Photo eyes arrays 200, 210, 220, 230, and 240, 250 are utilized to present a field of view of the inductor feed conveyor occupancy zone 15 established for a given velocity V2 of parcels fed to the receiving conveyor occupancy defined zone as the parcels are conveyed toward a concentrated desired occupancy zone at a selected position after the transition section zone where the inductor feed conveyor and receiving collector conveyor 12 merge. Feed conveyors 44, 46, 47, 48, and 50 also include modules or conveyor sections having designated motors which operate independently to decrease or increase the density of the articles on a collection conveyor 12.

Each of the conveyors or sections of a conveyor are driven by a separate variable speed motor. This allows speeding up and slowing down of the individual sections of conveyor 50 to allow packages to be spaced out or concentrated in a given area in a desirable way depending upon the optimum flow rate for processing by the accumulator 35 or singulator 8. For instance, when a large gap is detected between two particular packages, the rate of speed of the sections of conveyor between the packages are increased in order to close the gap between the packages.

Range sensing photo eyes arrays determine the density of parcels on the feed conveyors just before they merge onto the collector belt 12 at their respective photo eye array areas 200-250. Another eye array 32 monitors the area 319 which includes the singulator conveyor 8. Photo eyes 260, 270, 280, 290, 300, and 320 monitor selected sections of conveyor 12 which lie before the areas where the infeed conveyors merge with the collector conveyor 12. Electrical cabinet 51 contains a video computer 500 which receives video input data from photo eyes arrays 200-250 and 32. Electrical cabinet 52 contains speed controllers for the motors for all of the conveyors 44-50. The computer is capable of counting individual packages and calculating the size "area" of packages as well based on information coming from the various photo eyes monitoring the conveyors.

Singulator conveyor 8 receives randomly dispersed packages and aligns them in single file with respect to the movement of the conveyor. An example of a singulator conveyor is described in U.S. Pat. Nos. 5,701,989 and 10,773,897 which are incorporated by reference herein in their entirety.

The singulator conveyor 8 receives packages and articles such as bags or envelopes, parcels, boxes, luggage, mail, or other goods form the up stream conveyor 12. After the singulator conveyor 8, the individual packages are sorted and sent to a recirculating conveyor 14. The recirculating conveyor 14 conveys packages which have been removed during the alignment process back to a selected receiving conveyor collector conveyor 12 to be re-sorted on the singulator. The primary objective of the present invention is to keep the singulator conveyor 8 fully supplied with a steady flow of packages without jamming the packages accumulating on the collector conveyor 12 due to surges and slugs of packages received from up stream feed conveyors.

The singulator conveyor system is capable of handling random sized packages. Preferably, packages on the feed conveyors are single file; however, it is not uncommon for the packages to be irregularly spaced and oriented in random directions as they are off loaded from the trucks onto a selected feed conveyor 44, 46, 47, 48, and 50. The unloading usually occurs in slugs wherein a large volume of packages are off loaded in a short period of time.

For instance, photo eye array 30 detect parcels in areas that convey to the occupancy zones for conveyor sections 122 and 123. If the packages in the area are of a low density in occupancy zone area 210 as monitored by photo eyes array 210, the digital image data (pixels) is processed by the controller and computer controls conveyor 48 to start, stop, slow or increase feed rate of the packages onto a collector conveyor section 124.

The packages are conveyed down stream toward conveyor section 35 and are monitored via photo eyes arrays 260, 270, 280, 290, 300, and 310 as the packages move through the transition sections between the conveyors and through subsequent range sensing photo eye array occupancy zones, the computer program analyzes the overall loading of conveyor sections on a pixel by pixel basis. A package in a particular occupancy zone area is monitored by the photo eyes and a digital image of the size of the foot print of the package is ascertained by the computer 500. The computer determines if the maximize the area of the conveyor in accordance with the feed rate and downstream load. The range sensing photo eye array based package management system will utilize the area of the entire conveyor assembly to control the flow of packages to the singulator, separator, scanner or processing site. The conveyor speed is controlled as a function of occupancy on a collector or just prior to a singulator. The computer feeds the information to the conveyor speed controllers to introduce packages from one or more feed conveyors to a collection conveyor wherein packages are detected by one or more photo eyes arrays. The speed of selected conveyors is controlled for arrangement of the packages at optimal spacing maximizing the density of the packages on a conveyor and throughput of the system and accordingly minimizing the number of conveyors required for the system.

When the density of the packages decreases at the transition zone between a feed conveyor and the collector conveyor 12, gaps are formed between packages resulting in increasing the rate of speed of a selected feed conveyor in order to maintain a desired flow rate of packages to the collector to maximize throughput of the singulator.

This control scheme gives priority any selected conveyor. For instance, priority may be given to the first feed conveyors at the beginning of the collector conveyor 12 where the collector conveyor 12 will tend to be empty or have a less dense loading. Therefore, packages on the first feed conveyors will typically have more free area. Selected sections of collector conveyor 12 can be slowed down or even stopped to allow the latter feed conveyors to unload, as may be desired. Moreover, the collector conveyor 12 may be slowed or stopped to force more packages from the feed conveyor to push additional articles onto the collector conveyor 12 so that the area of the collector conveyor is full.

The package flow management control system 5 maximizes throughput of packages to a singulator conveyor and a sorting system, utilizing the greatest amount of area on the collector conveyor 12 or accumulator prior to the singulator 8. Other conveyors in the conveyor system are controlled based on the maximum capacity of the singulator determined at a constant rate of speed rather than an average of surge capacities. The increased efficiency enables the system to minimize the number of conveyors required and the area, width, and/or length of the conveyors in the system to achieve a desired throughput at maximum efficiency.

The computer 500 utilizes a plurality of range sensing photo eyes arrays to monitor the occupancy zones of selected areas on the conveyors leading up to singulator or separation process. The computer compares the amount of free space on the selected conveyors and compares it to the size of the package on the feed conveyor. If there is a adequate space, the feed conveyor will transfer the package. The amount of room required by a given package is determined by the programmer. For instance, the program may required that the amount of space on the collector conveyor is 1.5 or even 2 times the footprint of a given package depending on the orientation of the adjacent articles. Rate of speed changes of various conveyors are also controlled by the computer to keep the singulator conveyor fully supplied. The computer send speed control signals to the speed controllers of all the conveyor sections to regulate throughput of packages.

As best shown in FIGS. 11-14, articles on a feed conveyor intersects with a collector conveyor to illustrate sequentially how a package 89 is inserted from a feed conveyor 11 onto a receiving/collecting conveyor 12 containing a plurality of packages 81-88 inserting a package 89 into a gap 90 between other packages on the moving collector conveyor 12.

As illustrated in FIG. 15, a plurality of packages 91 are conveyed on a collector conveyor 12. A angled feed conveyor 92 and a perpendicular side feed conveyor 93 each carrying a parcel 89 intersects with the collector conveyor 12 whereby the speed of both of the feed conveyors 92 and 93 are controlled to insert the parcel 89 into gaps formed between the preexisting parcels 91 on the collector conveyor 12.

The range sensing photo eye array parcel flow management system includes a plurality of feed conveyors induction feed conveyors in line or angled at up to 90 degrees to the receiving conveyor, an optional recirculating conveyor 14, an optional accumulator, sorting lanes, and a singulator conveyor 8.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims

We claim:

1. A method of measuring and controlling density of parcels on a conveyor, using programmable logic controller, comprising the steps of:

selecting a transition zone between a feed conveyor and a receiving conveyor each one having independent drive means;

selecting a range sensing field of measurement of said selected transition zone;

determining a percentage of an actual occupancy of a feeding conveyor occupancy defined zone;

determining a percentage of actual occupancy of a receiving conveyor occupancy defined zone;

selecting a percentage of a desired occupancy of said receiving conveyor after a merger of said parcels from said feeding conveyor to said receiving conveyor;

feeding said parcels from said feed conveyor at a selected rate of speed to said receiving conveyor occupancy defined zone; and merging said parcels at a conveyor area of said transition zone between said feed conveyor and said receiving conveyor and adjusting conveyor speed ratios proportioned according to ratio of desired density to current density to increase the density or volume of parcels in a selected area of the receiving conveyor.

2. The method of measuring and controlling density of parcels on a conveyor of claim 1, including the step of a control algorithm identifying, locating, or tracing a package, a parcel, or other item on said feed conveyor by its digital image, a scanner code, or a digital footprint.

3. A range sensing photo eye array apparatus for measuring and controlling the density of parcels on a conveyor, comprising:

a feed conveyor and a receiving conveyor each one having independent drive motors;

said feed conveyor including a range sensing field of measurement at a distal discharge end adjacent said receiving conveyor said receiving conveyor including a range sensing field of measurement at a distal receiving end adjacent said feed conveyor;

a range sensing photo eye array having a virtual encoder and a signal generating and detecting means extending across the surface of said feed conveyor field of measurement and said receiving conveyor field of measurement;

computer means for calculating percentage of desired occupancy of said receiving conveyor and percentage of actual occupancy of said receiving conveyor;

a programmable logic controller for controlling said conveyor speed and movement based upon signals received from said photo eye array identifying gaps between packages on said receiving conveyor of sufficient space for insertion of an additional package from said feeding conveyor.

4. The range sensing photo eye array apparatus of claim 3, wherein density measuring apparatus recognizes and maximizes conveyor surface area utilization.

5. The range sensing photo eye array apparatus of claim 3, wherein density comprises an arear, a volume, a weight, or combinations thereof.

6. The range sensing photo eye array apparatus of claim 3, wherein a plurality of said range detection photo eye array are positioned at selected individual input points in wired or wireless communication with a programmable logic controller, "PLC" or computer and include a process control algorithm to recognize incoming flow density, in terms of both belt utilization and throughput rate.

7. The range sensing photo eye array apparatus of claim 6, wherein said control algorithm recognizes individual items and the rate at which said individual items are passing, and the area utilization of the collector belt.

8. The range sensing photo eye array apparatus of claim 6, wherein said control algorithm recognizes an average parcel size by area, by volume, a parcel length, a parcel width, and parcel height.

9. The range sensing photo eye array apparatus of claim 6, wherein said control algorithm recognizes a weight of said parcel.

10. The range sensing photo eye array apparatus of claim 3, wherein said range detection photo eye array defines a density based detection system recognizing belt area utilization and parcel count.

11. A method of measuring and controlling density of articles on a conveyor using programmable logic controller,, comprising the steps of:

selecting a transition zone between a feed conveyor and a receiving conveyor each one having independent drive means;

selecting a range sensing field of measurement of said selected transition zone, said range sensing field of measurement including a range sensing photo eye array in communication with a virtual encoder and a signal generating and detecting means extending across said selected transition zone;

determining a percentage of an actual occupancy of a feed conveyor occupancy defined zone;

determining a percentage of actual occupancy of a receiving conveyor occupancy defined zone;

calculating a feed conveyor density of articles on said feed conveyor as a percentage of said feed conveyor occupancy and calculating a receiving conveyor density of articles on said receiving conveyor as a percentage of said receiving conveyor density of said articles in said transition zone with computer means;

selecting a percentage of a desired occupancy of said receiving conveyor after a merger of said articles from said feeding conveyor to said receiving conveyor;

feeding said articles from said feed conveyor at a selected rate of speed to said receiving conveyor occupancy defined zone;

merging said articles at said conveyor area of said transition zone between said feed conveyor and said receiving conveyor and adjusting conveyor speed ratios proportioned according to ratio of desired density to current density to increase the density or volume of articles in a selected area of the receiving conveyor; and controlling said conveyor speed and movement with said computer means based upon signals received from said range sensing photo eye array identifying gaps between said articles on said receiving conveyor of sufficient space for insertion of additional articles from said feed conveyor.

12. The method of measuring and controlling density of articles on a conveyor of claim 11, further comprising the step of controlling the speed of said feed conveyor, of said receiver conveyor, or the speed of both said feed conveyor and said receiver conveyor to achieve a desired density based on a percentage of said conveyor area occupancy defined zone.

13. The method of measuring and controlling density of parcels on a conveyor of claim 11, including the step of providing multiple range sensing photo eyes arrays to monitor selected positions of said conveyor flow.

14. The method of measuring and controlling density of parcels on a conveyor of claim 13 including the step of providing an IP address to each range sensing photo eye array.

15. The method of measuring and controlling density of parcels on a conveyor of claim 13, including the steps of monitoring and controlling speed and movement of said feed conveyor and said receiving conveyor with a computer based upon signals received from said range sensing photo eye array identifying a gap between packages on said receiving conveyor of sufficient space for insertion of an additional package from said feeding conveyor.

16. The method of measuring and controlling density of parcels on a conveyor of claim 11, including the step of setting a speed or movement of said feed conveyor, said receiving conveyor, or both said feed conveyor and said receiving conveyor as a function of occupancy on a collector.

17. The method of measuring and controlling density of parcels on a conveyor of claim 11, including the step of setting a speed or movement of said feed conveyor, said receiving conveyor, or both said feed conveyor and said receiving conveyor as a function of occupancy just prior to conveyance of said packages onto a singulator.

18. The method of measuring and controlling density of parcels on a conveyor of claim 17, including the step of calculating an average parcel size, by area, by volume, a parcel length, a parcel width, and parcel height with a control algorithm.

19. The method of measuring and controlling density of parcels on a conveyor of claim 11, including the step of using said range detection photo eye arrays positioned at selected individual input points in wired or wireless communication with a programmable logic controller, "PLC" or computer utilizing a process control algorithm to recognize incoming flow density in terms of both belt utilization and throughput rate.

20. The method of measuring and controlling density of parcels on a conveyor of claim 19, including the step of identifying, locating, or tracing said article by its digital image, a scanner code, or a digital footprint with said control algorithm.

21. The method of measuring and controlling density of parcels on a conveyor of claim 19, including the steps of forming an array including a plurality of range sensing photo eye arrays, each one of said plurality of range sensing photo eye arrays representing one pulse of said virtual encoder defining a selected length of the selected distance, and the average measured occupancy of said array is calculated by determining the combination of said range sensing photo eye array outputs blocked when an encoder pulse occurs representing a percentage of fullness of the receiving conveyor with a programmable logic controller using an algorithm, wherein a measured occupancy of said feed conveyor is compared to is compared to a desired occupancy of said receiving conveyor and calculating a speed ratio by dividing the desired occupancy by the measured occupancy and regulating the speed of said feed conveyor, said receiving conveyor, or both said feed conveyor and said receiving conveyor to obtain a desired occupancy on said receiving conveyor.

22. The method of measuring and controlling density of parcels on a conveyor of claim 19, wherein conveyor speed is controlled as a function of occupancy by volume, by area, or by density on a selected conveyor just prior to a slide sorter or a collector conveyor or a singulator conveyor or said receiving conveyor with a control algorithm to recognize incoming flow occupancy by volume, by area, or by density in terms of both belt utilization and throughput rate to control said article input flow.

23. The method of measuring and controlling density of parcels on a conveyor of claim 11, including the step of creating a table of sensing ranges with a plurality of range sensing photo eye arrays, wherein each range sensing photo eye array includes two outputs and each one is independently adjustable to obtain two different ranges, and said plurality of range sensing photo eye arrays are installed on a first side and an opposing second side of a selected field of measurement of said feed conveyor and said receiving conveyor at a selected distance from an discharge end of said feed conveyor and said receiving end of said receiving conveyor, and a pulse is produced at selected intervals along said field of measurement of said conveying surface with a programmable virtual encoder.

24. The method of measuring and controlling density of parcels on a conveyor of claim 11, including the step of counting, identifying, locating, said article on said receiving conveyor by its digital image or footprint.

25. The method of measuring and controlling density of parcels on a conveyor of claim 11, including the step of providing a range sensing photo array conveyor article management system regulating an input flow to a collector conveyor by placing said range sensing photo eye array assembly at each feed conveyor input of said articles to said collector conveyor, allowing control of the speed of each of said feed conveyor input with respect to the speed of said collector conveyor to the maximize the flow of packages.

26. A range sensing apparatus for measuring and controlling the density of articles on a conveyor, comprising:
a feed conveyor and a receiving conveyor each one having independent drive motors;
said feed conveyor including a range sensing field of measurement at a distal discharge end adjacent said receiving conveyor;
said receiving conveyor including a range sensing field of measurement at a distal receiving end adjacent said feed conveyor;
a range sensing device having a virtual encoder and a signal generating and detecting means extending across the surface of said feed conveyor field of measurement and said receiving conveyor field of measurement;
computer means for calculating percentage of desired occupancy of said receiving conveyor and percentage of actual occupancy of said receiving conveyor;
a programmable logic controller for controlling a conveyor speed and movement based upon signals received from said range sensing detection device identifying gaps between packages on said receiving conveyor of sufficient space for insertion of an additional package from said feeding conveyor.

27. The range sensing apparatus of claim 26, wherein said range sensing detection device is selected from the group consisting of a range sensing photo eye array, a range sensing photo eye, a camera, a pixel detecting device, a digital imaging device, and combinations thereof positioned at an input point of said receiving conveyor or a collector conveyor or a singulator conveyor or a sorting conveyor or combinations thereof.

28. The range sensing apparatus of claim 26, wherein said range sensing detection device comprises at least one range sensing photo array.

29. The range sensing apparatus of claim 26, wherein said apparatus for measuring and controlling density recognizes and maximizes conveyor surface area utilization.

30. The range sensing apparatus of claim 26, wherein density comprises an area, a volume, a weight, and combinations thereof.

31. The range sensing apparatus of claim 26, wherein said range sensing device is positioned at selected individual input points in wired or wireless communication with a programmable logic controller, "PLC" or computer including a process control algorithm to recognize incoming flow density in terms of both belt utilization and throughput rate.

32. The range sensing apparatus of claim 31, wherein said control algorithm recognizes individual articles and the rate at which said individual articles are passing, and the area utilization of a collector belt.

33. The range sensing apparatus of claim 31, wherein said control algorithm recognizes an average article size by area or by volume or an article length or an article width or an article height.

34. The range sensing apparatus of claim 31, wherein said control algorithm recognizes a weight of said article.

35. The range sensing apparatus of claim 31, wherein said computer or said programmable logic controller having an algorithm for calculating an average measured occupancy of said range sensing device represents a percentage of fullness of said receiving conveyor.

36. The range sensing apparatus of claim 31, wherein said computer calculates a selected maximum percentage of occupancy of said receiving conveyor based on said rate of speed of said feed conveyor.

37. The range sensing apparatus of claim 31, wherein said computer interfaces with and controls and integrates with a conveyor computer control system via, smart electronic devices including a smart phone, a computer tablet, a laptop computer and visual aid computer based devices capable of communicating with a computer system.

38. The range sensing apparatus of claim 26, wherein said range sensing device recognizes belt area utilization and article count.

39. The range sensing apparatus of claim 26, further comprising a plurality of opposing range sensing devices for creating a table of sensing ranges, wherein each range sensing device has two outputs and each one is independently adjustable to obtain two different ranges, said plurality of range sensing devices is installed on a first side and an opposing second side of range a sensing field of measurement of said feed conveyor or a range sensing field of measurement of said receiving conveyor.

40. The range sensing apparatus of claim 26, wherein said virtual encoder is programmable to produce a pulse at selected intervals of said feed conveyor.

41. The range sensing photo eye array apparatus of claim 26, wherein said range sensing photo eye array depicts belt area utilization and article count.

42. A range sensing photo eye array apparatus for measuring and controlling the density of articles on a conveyor, comprising:
a feed conveyor and a receiving conveyor each one having independent drive motors;
said feed conveyor including a range sensing field of measurement at a distal discharge end adjacent said receiving conveyor;
said receiving conveyor including a range sensing field of measurement at a distal receiving end adjacent said feed conveyor;
at least one range sensing photo eye array having a virtual encoder and a signal generating and detecting means extending across the surface of said feed conveyor field of measurement and said receiving conveyor field of measurement;
computer means for calculating percentage of desired occupancy of said receiving conveyor and percentage of actual occupancy of said receiving conveyor;
a programmable logic controller for controlling a conveyor speed and movement based upon signals received from said range sensing detection device identifying gaps between packages on said receiving conveyor of sufficient space for insertion of an additional package from said feeding conveyor.

43. The range sensing photo eye array apparatus of claim 42, further including at least one detection device selected from the group consisting of a camera, a pixel detecting device, a digital imaging device, and combinations thereof positioned at an input point of said receiving conveyor or a collector conveyor or a singulator conveyor or a sorting conveyor or combinations thereof.

44. The range sensing photo eye array apparatus of claim 42, wherein density comprises an area, a volume, a weight, and combinations thereof.

45. The range sensing photo eye array apparatus of claim 42, wherein said range sensing photo eye array is positioned at selected individual input points in wired or wireless communication with a programmable logic controller, "PLC" or computer and include a process control algorithm to recognize incoming flow density, in terms of both belt utilization and throughput rate.

46. The range sensing photo eye array apparatus of claim 45, wherein said control algorithm recognizes an average article size by area or by volume, an article length, an article width, and an article height.

47. The range sensing photo eye array apparatus of claim 45, wherein said control algorithm recognizes a weight of said article.

48. The range sensing photo eye array apparatus of claim 45, wherein said computer or a programmable logic controller having an algorithm for calculating an average measured occupancy of said range sensing photo eye array representing a percentage of fullness of said receiving conveyor.

49. The range sensing photo eye array apparatus of claim 42, wherein a control algorithm recognizes individual articles and the rate at which said individual articles are passing, and the area utilization of a collector belt.

50. The range sensing photo eye array apparatus of claim 42, wherein said computer means calculates a selected maximum percentage of occupancy of said receiving conveyor based on said rate of speed of said feed conveyor.

51. The range sensing photo eye array apparatus of claim 42, further comprising a plurality of opposing range sensing photo eye arrays for creating a table of sensing ranges, wherein each range sensing photo eye array has two outputs and each one is independently adjustable to obtain two different ranges, said plurality of range sensing photo eye arrays including a first range sensing photo eye array is installed on a first side of said feeding and receiving conveyors and a second range sensing photo eye array is installed on an opposing second side of said feeding and receiving conveyors in said transition zone including said range sensing field of measurement of said feed conveyor and said range sensing field of measurement of said receiving conveyor.

52. The range sensing photo eye array apparatus of claim 42, wherein said virtual encoder is programmable to produce a pulse at selected intervals of said feed conveyor.

53. The range sensing apparatus of claim 42, wherein said computer interfaces with and controls and integrates with a conveyor computer control system via smart electronic devices including a smart phone, a computer tablet, a laptop computer and visual aid computer based devices capable of communicating with a computer system.

54. The range sensing photo eye array apparatus of claim 42, wherein said range sensing photo eye array includes a plurality of array elements, each of said array elements representing one pulse of the virtual encoder defining a selected length of said range sensing field of measurement.

* * * * *